United States Patent
Sade

(10) Patent No.: US 9,529,196 B1
(45) Date of Patent: Dec. 27, 2016

(54) IMAGE GUIDE OPTICS FOR NEAR EYE DISPLAYS

(71) Applicant: iPhysicist Ltd., Natania (IL)

(72) Inventor: Sharon Sade, Kfar-Yona (IL)

(73) Assignee: iPhysicist Ltd., Natania (IL)

(*) Notice: Subject to any disclaimer, the term of this patent is extended or adjusted under 35 U.S.C. 154(b) by 0 days.

(21) Appl. No.: 14/730,831

(22) Filed: Jun. 4, 2015

Related U.S. Application Data

(60) Provisional application No. 62/007,971, filed on Jun. 5, 2014.

(51) Int. Cl.

| | | |
|---|---|---|
| G02B 27/14 | (2006.01) | |
| G03H 1/00 | (2006.01) | |
| G03B 21/26 | (2006.01) | |
| G09G 5/00 | (2006.01) | |
| H04N 7/00 | (2011.01) | |
| G02B 27/01 | (2006.01) | |
| G02B 17/08 | (2006.01) | |
| G02B 27/00 | (2006.01) | |

(52) U.S. Cl.
CPC ........... *G02B 27/0172* (2013.01); *G02B 17/08* (2013.01); *G02B 17/086* (2013.01); *G02B 27/0025* (2013.01); *G02B 27/0037* (2013.01)

(58) Field of Classification Search
CPC ............ G02B 27/0172; G02B 27/0149; G02B 27/145; G02B 27/0101; H02K 21/24; H02K 21/12; H02K 15/02; H02K 2201/12; G03B 21/00; G03B 21/14; G01C 21/22; G09F 19/18; G09G 3/003
USPC .................... 359/630–634, 13–14; 310/49 R, 310/156.32–156.35, 266–268, 815.74; 353/11–12, 28, 119; 345/7, 9; 340/438, 340/980, 995.1, 815.47, 815.74; 348/115; 351/200, 205–206, 210, 221
See application file for complete search history.

(56) References Cited

U.S. PATENT DOCUMENTS

| | | |
|---|---|---|
| 5,699,194 A | 12/1997 | Takahashi |
| 6,185,045 B1 * | 2/2001 | Hanano .............. G02B 27/0172 359/630 |
| 6,351,333 B2 | 2/2002 | Araki et al. |
| 6,351,338 B2 | 2/2002 | Nanba |
| 6,409,352 B1 | 6/2002 | Sunaga |
| 6,805,490 B2 | 10/2004 | Levola |
| 6,952,598 B2 | 10/2005 | Kiyomatsu et al. |
| 7,184,615 B2 | 2/2007 | Levola |
| 8,405,573 B2 | 3/2013 | Lapidot et al. |
| 8,432,614 B2 | 4/2013 | Amitai |
| 8,446,340 B2 | 5/2013 | Aharoni |
| 2002/0141083 A1 | 10/2002 | Chen |
| 2002/0145573 A1 | 10/2002 | Cheng |
| 2003/0067685 A1 | 4/2003 | Niv |
| 2005/0078388 A1 | 4/2005 | Amitai |

(Continued)

FOREIGN PATENT DOCUMENTS

| | | |
|---|---|---|
| EP | 1731943 | 12/2006 |
| WO | WO 2005/024491 | 3/2005 |

(Continued)

*Primary Examiner* — Dawayne A Pinkney

(57) ABSTRACT

An image processing guide comprising: a solid body comprising: a plurality of surfaces defining an optical pathway from an input surface to an output surface, where the optical pathway connects the plurality of surfaces successively; wherein the plurality of surfaces comprises at least one curved reflective surface configured to receive light from the optical pathway and to return light to the optical pathway; wherein the optical signal is not focused to an image plane within the solid body.

27 Claims, 18 Drawing Sheets

(56) References Cited

U.S. PATENT DOCUMENTS

| | | |
|---|---|---|
| 2006/0018014 A1 | 1/2006 | Niv et al. |
| 2006/0221448 A1 | 10/2006 | Nivon et al. |
| 2007/0058261 A1 | 3/2007 | Sugihara et al. |
| 2009/0097122 A1 | 4/2009 | Niv |
| 2009/0097127 A1 | 4/2009 | Amitai |
| 2010/0290127 A1* | 11/2010 | Kessler .............. G02B 27/0172 359/631 |
| 2013/0127980 A1* | 5/2013 | Haddick ................ G06F 3/013 348/14.08 |
| 2013/0229717 A1 | 9/2013 | Amitai |
| 2014/0293434 A1* | 10/2014 | Cheng ................ G02B 27/225 359/630 |

FOREIGN PATENT DOCUMENTS

| | | |
|---|---|---|
| WO | WO 2007/055742 | 5/2007 |
| WO | WO 2007/141587 | 12/2007 |
| WO | WO 2007/141588 | 12/2007 |
| WO | WO 2007/141589 | 12/2007 |
| WO | WO 2007/141606 | 12/2007 |
| WO | WO 2008/026452 | 3/2008 |

* cited by examiner

Couple optical signal into image processing guide
100

Transfer optical signal in at least one direction through the guide, without focusing signal (e.g. into a focal point and/or image plane) within the guide
102

Project optical signal out of image processing guide
104

IMAGE GUIDE OPTICS FOR NEAR EYE DISPLAYS

RELATED APPLICATION

This application claims the benefit of priority under 35 USC §119(e) of U.S. Provisional Patent Application No. 62/007,971 filed Jun. 5, 2014, the contents of which are incorporated herein by reference in their entirety.

FIELD AND BACKGROUND OF THE INVENTION

The present invention, in some embodiments thereof, relates to image processing guides and, more particularly, but not exclusively, to image processing guides for head mounted near eye displays (HMNEDs).

The present invention relates to methods and systems for optical configuration and, more particularly, but not exclusively, to an optical configuration having small and thin dimensions for an imaging or non-imaging (afocal or light concentrator) system/s.

In recent years, the demand for high-performance compact optical systems has increased. Some of the optical systems are imaging systems which convey an image of a scene to an image sensor such as a complementary metal-oxide semiconductor (CMOS) based sensor or a charge-coupled device (CCD)-based sensor. Other optical systems (e.g. head mounted displays) convey a digital image from an image source such as a liquid-crystal display (LCD) or liquid-crystal on silicon (LCOS) to create a virtual image to the eye by projecting the digital image directly to the eye. Other optical systems convey a digital image from an image source to a white board or screen, thus projecting a digital image on the screen. Other optical systems, such as binocular or telescopes, just expand or narrow the field-of-view (FOV) of the user. Other optical systems are non-imaging systems used to collect light or to concentrate light into a sensor.

A number of solutions have been developed in order to allow thin and small sized optical systems. For example, U.S. Patent Publication No. 2009/097122 discloses "An optical relay device for transmitting light striking the optical relay device at a plurality of angles within a field-of-view is provided. The device comprises a light-transmissive substrate, an input optical element and an output optical element. The input element diffracts the light to propagate within the light-transmissive substrate via total internal reflection, and the output element diffracts the light out of the substrate. The output element is characterized by planar dimensions selected such that at least a portion of one or more outermost light rays within the field-of-view is directed to a two-dimensional region being at a predetermined distance from the substrate."

Another example, U.S. Patent Publication No. 2009/097127, discloses "an optical device, including a light-transmitting substrate, optical means for coupling light into the substrate by total internal reflection, and a plurality of partially reflecting surfaces carried by the substrate, characterized in that the partially reflecting surfaces are parallel to each other and are not parallel to any of the edges of the substrate."

Another example, U.S. Pat. No. 6,805,490, discloses "A planar substrate having a first diffractive element for coupling light waves of different colors into the substrate and guiding the light waves by successive internal reflections. A second diffractive element, disposed on the substrate, causes the guided light waves to be partially transmitted out of the substrate where the light waves encounter the second diffractive element. Because light waves of each color are reflected at different reflection angles, the light waves with smaller reflection angles encounter the second diffractive element at more locations than those with larger reflection angles, resulting in color non-uniformity in the light transmitted out from the substrate surface. One or more interfaces are provided between the surfaces of the substrate to selectively reflect the light waves having larger reflection angles toward the second diffraction element, so that light waves of different colors encounter the second diffraction element substantially at the same number of locations."

Additional background art includes U.S. Pat. No. 6,351,333, U.S. Pat. No. 6,351,338 and U.S. Pat. No. 6,409,352.

SUMMARY OF THE INVENTION

According to an aspect of some embodiments of the present invention there is provided an image processing guide comprising:

a solid body comprising:

a plurality of surfaces defining an optical pathway from an input surface to an output surface, where the optical pathway connects the plurality of surfaces successively;

wherein the plurality of surfaces comprises at least one curved reflective surface configured to receive light from the optical pathway and to return light to the optical pathway;

wherein the optical signal is not focused to an image plane within the solid body.

According to some embodiments of the invention, a shortest positive focal length selected from focal lengths of all reflective curved surfaces defining the optical pathway is larger than a distance from the curved surface with the shortest positive focal length to a successive surface in the optical path.

According to some embodiments of the invention an angle of marginal rays with respect to a chief ray reflected from each the reflective surface is between −60° and 60°.

According to some embodiments of the invention an angle of marginal rays with respect to a chief rays reflected from each reflective surface is between −40° and 40°.

According to some embodiments of the invention a converging or diverging length of the image processing guide is greater than an average thickness between two longest sides of the image processing guide multiplied by a number curved reflective surface configured to receive light from the optical pathway.

According to some embodiments of the invention the optical path transfers between a plurality of planes where orientation of at least one planes differs from at least one other plane in two dimensions.

According to some embodiments of the invention the input surface is a refractive surface.

According to some embodiments of the invention the optical signal exits the guide through a refractive output surface.

According to some embodiments of the invention the guide is an elongate element, including a maximal extent;

wherein the maximal extent is at least 5 times a thickness of the guide;

wherein the maximal extent is at least 3 times a height of the guide.

According to some embodiments of the invention a general direction of the optical path follows a central axis of the maximal extent.

According to some embodiments of the invention the central axis of the maximal extent bends by 35-55°.

According to some embodiments of the invention the image processing guide is constructed from a single block of material.

According to some embodiments of the invention comprising a diffractive optical element.

According to some embodiments of the invention the image processing guide comprises a freeform external shape.

According to some embodiments of the invention a head mounted near eye display comprises:

an image source producing an optical signal; and an image processing guide optically coupled to the image source;

wherein the image processing guide transfers the optical signal to a target.

According to some embodiments of the invention a final curved surface which changes a path of the optical signal is a semi-reflective surface.

According to some embodiments of the invention the head mounted near eye display comprises a final curved surface which changes a path of the optical signal is a selectively reflective surface.

According to some embodiments of the invention the head mounted near eye display comprises one or more scene correcting refractive element, located in front of a user eye;

wherein the one or more correcting refractive element cancels aberration in scenic light from the guide.

According to some embodiments of the invention the head mounted near eye display comprises one or more eyesight correction refractive element;

wherein the eyesight correction element corrects vision of a user.

According to some embodiments of the source is positioned on a head mounted near eye frame such that the source is outside a user's visual field.

According to some embodiments of the output surface and the input surface are, in at least one dimension 45° apart from each other.

According to some embodiments of the optical signal transferred to the target is the optical signal projected by the source guide is geometrically distorted by at most 5%.

According to some embodiments of the optical signal transferred to the target is the optical signal projected by the source guide is geometrically distorted by 1-10%.

According to some embodiments of the optical signal a pixilated image including an average pixel extent, wherein the optical signal transferred to the target is the optical signal projected by the source with lateral chromatic aberration of less than the average pixel extent.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the figures generally, like components are indicated with like numerals, however, it should be noted that in some figures similar elements to those indicated in previous figures are provided with a new leading figure number. For example, the component labeled 200 in FIG. 2 is generally the same type of component as the component labeled 100 in FIG. 1.

In the drawings:

FIG. 1A is a flow chart of a method of image transfer, according to some embodiments of the invention;

FIG. 1B is a simplified schematic illustration of chief and marginal rays for a curved reflective surface, according to some embodiments of the invention;

FIG. 1C is a is a simplified schematic illustration of chief and marginal converging rays, according to some embodiments of the invention;

FIG. 1D is a is a simplified schematic illustration of chief and marginal diverging rays, according to some embodiments of the invention;

FIG. 1E is a simplified schematic top view showing optical signal paths in an exemplary image processing guide, according to some embodiments of the invention;

FIG. 2A is a simplified schematic three dimensional side view of an optical path through an image processing guide, according to some embodiments of the invention;

FIG. 2B is a simplified schematic top view of an optical path through an image processing guide, according to some embodiments of the invention;

FIG. 2C is a simplified schematic side view of an optical path through an image processing guide, according to some embodiments of the invention;

FIG. 3 is a simplified schematic cross sectional view of a focal-afocal image processing guide according to some embodiments of the invention;

FIG. 4 is a simplified schematic front view of a user wearing a head mounted near eye display, according to some embodiments of the invention;

FIG. 5 is a simplified schematic top view of a portion of a head mounted optical device, worn by a user according to some embodiments of the invention;

Figure 6:
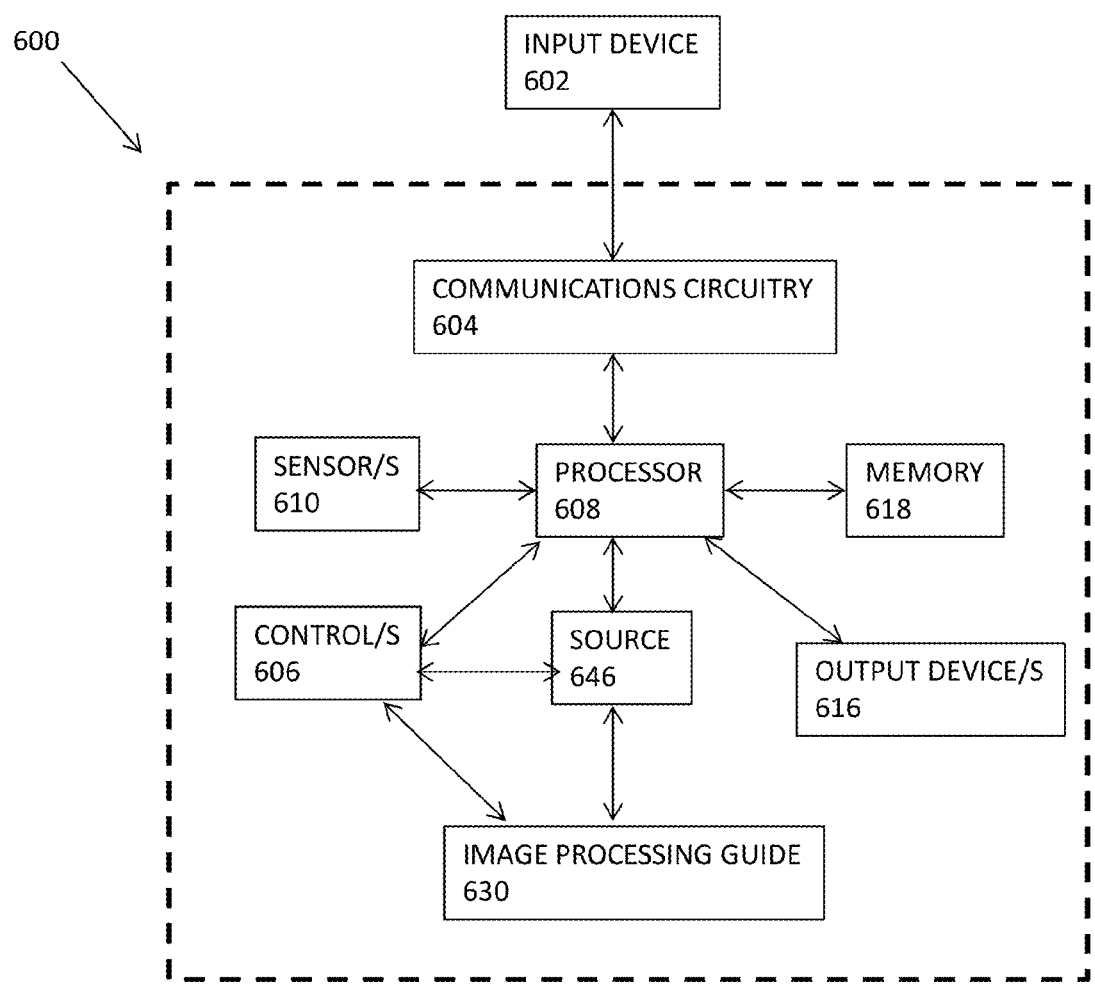
Figure 7:
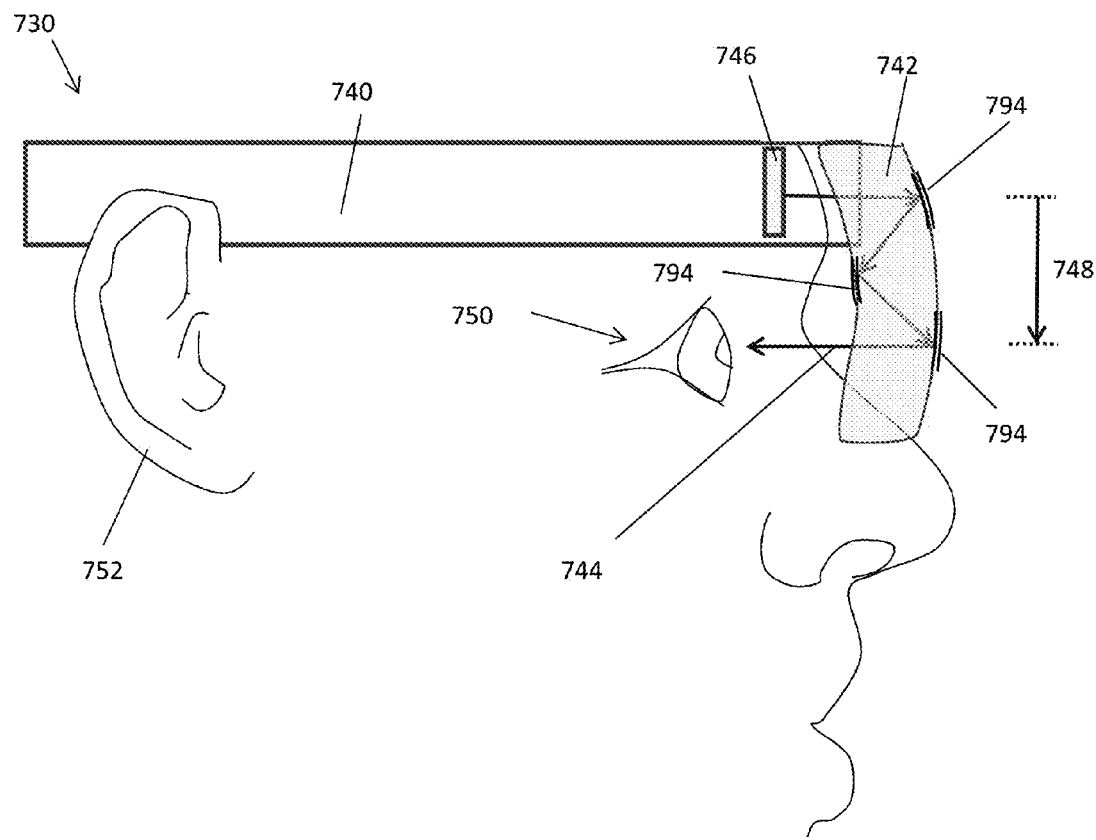
Figure 8:
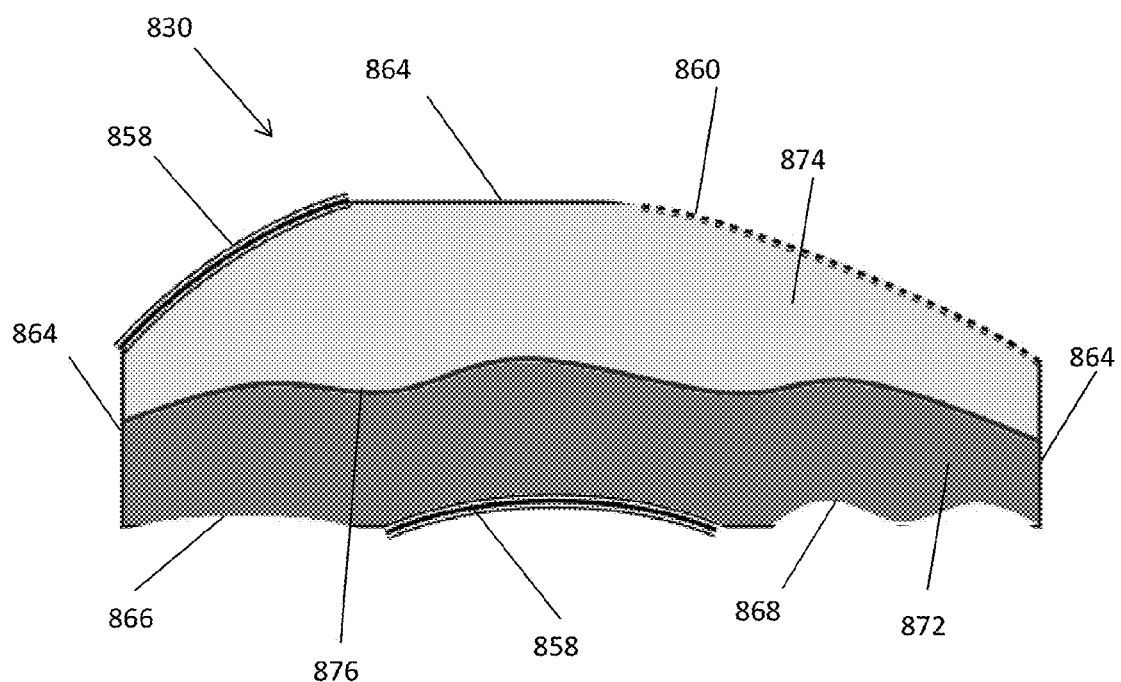
Figure 9:
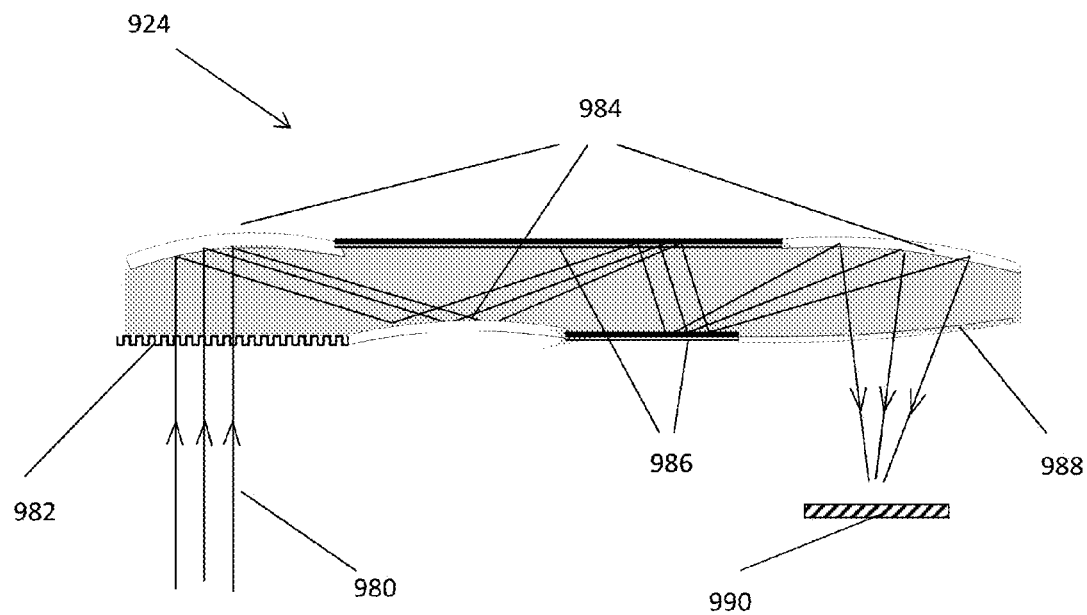
Figure 10:
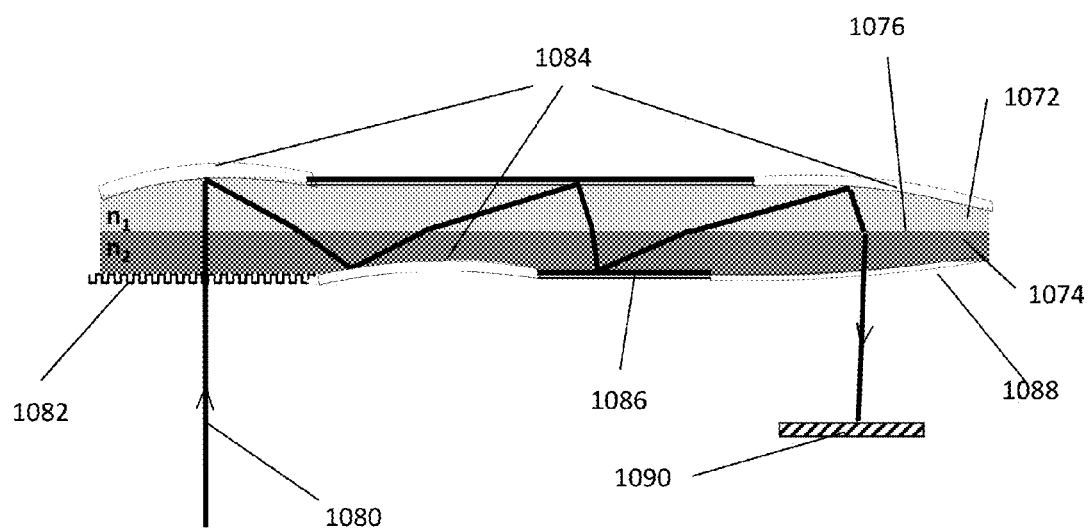
Figure 11:
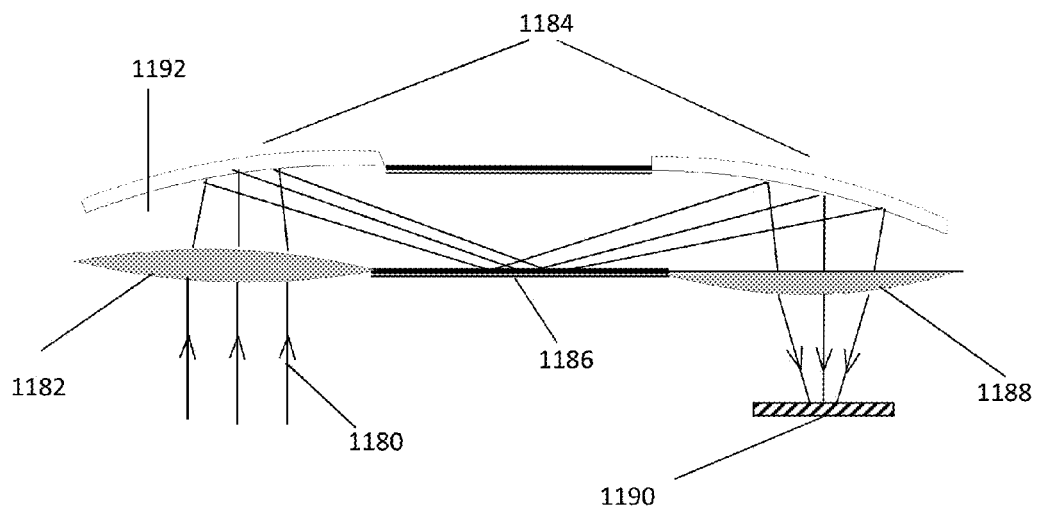
Figure 12:
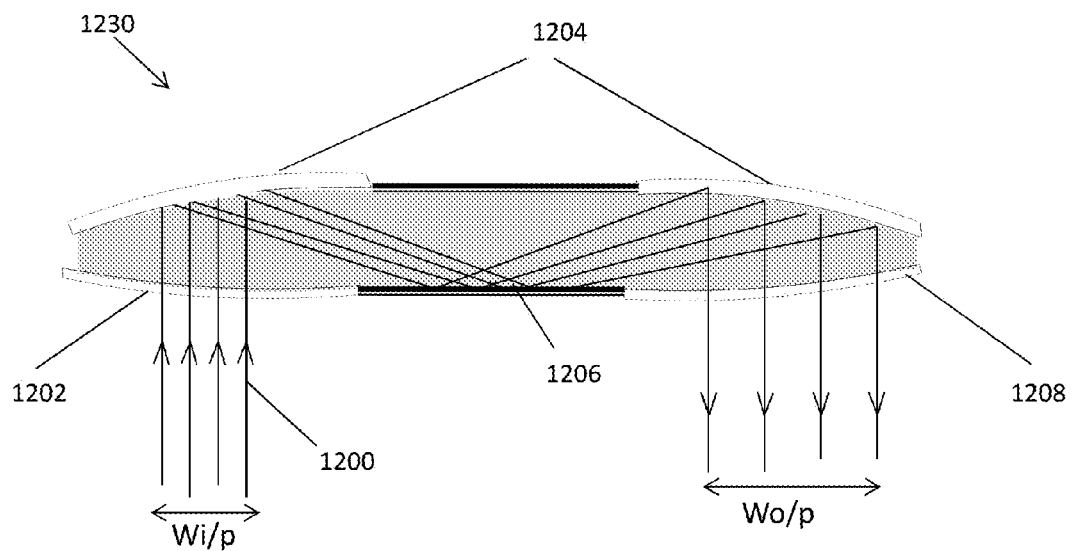
Figure 13:
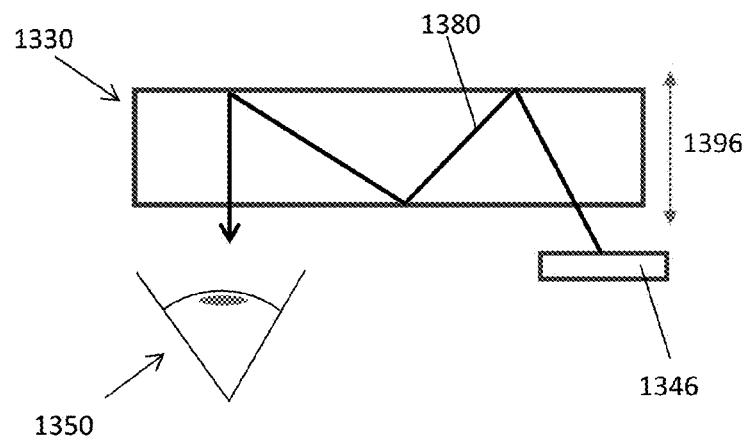
Figure 14:
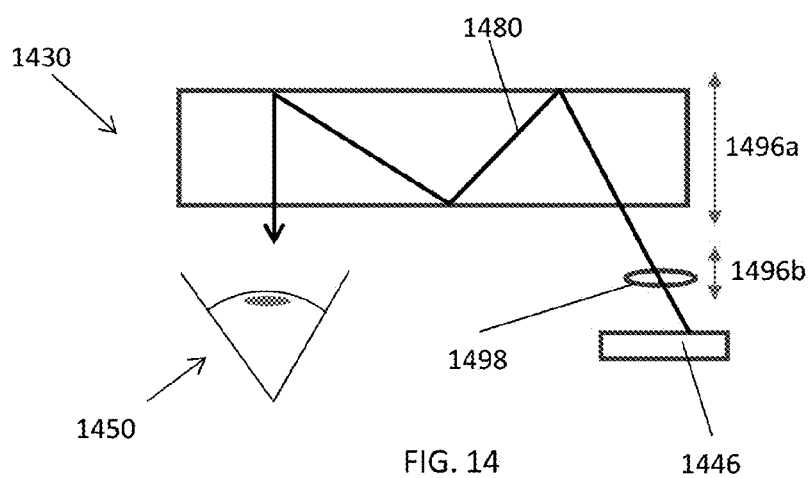
Figure 15A:
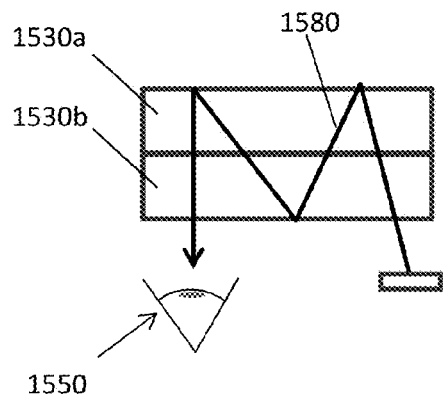
Figure 15B:
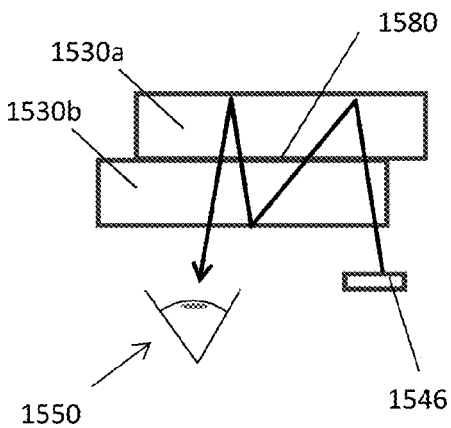
Figure 16:
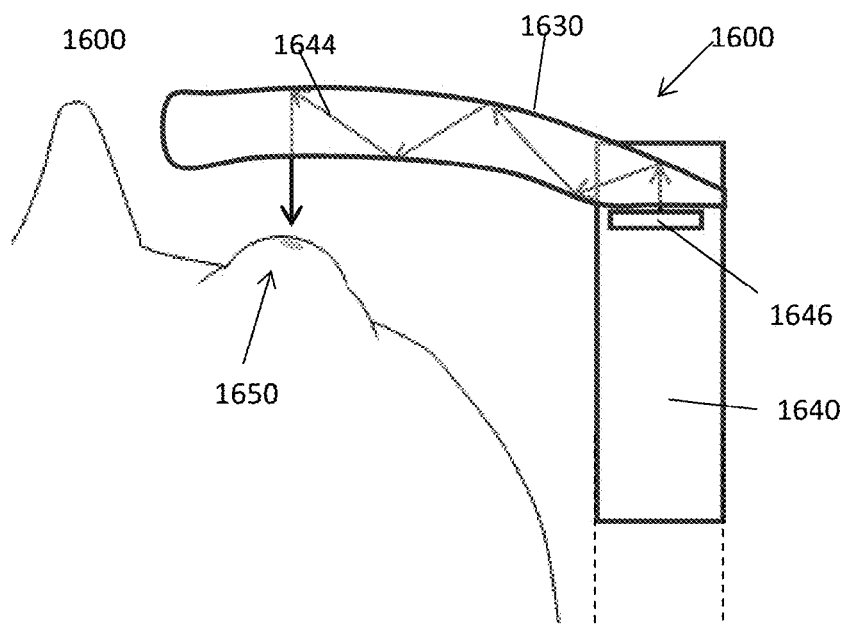
Figure 17:
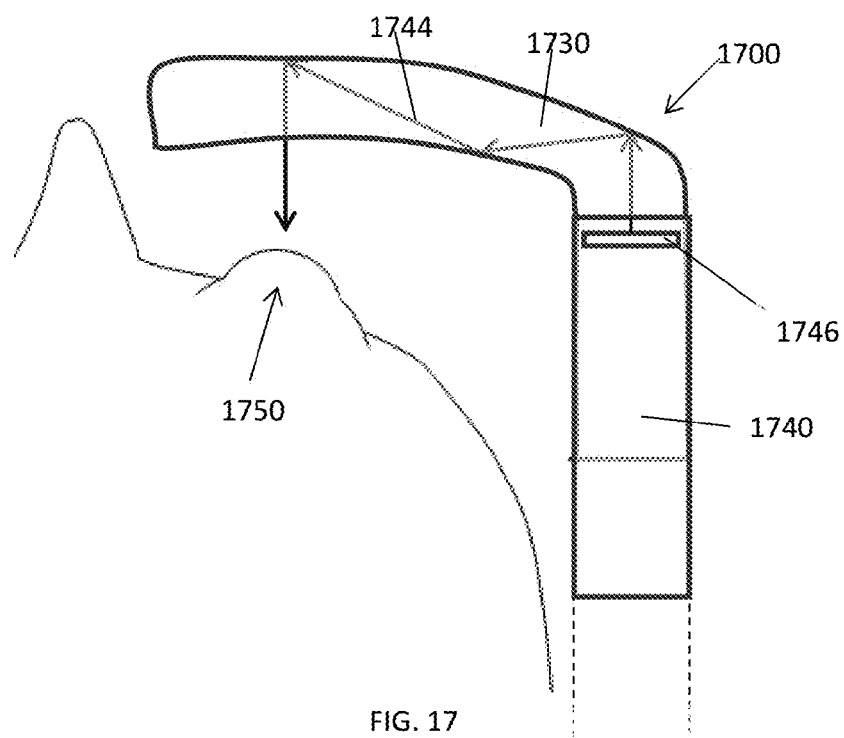
Figure 18:
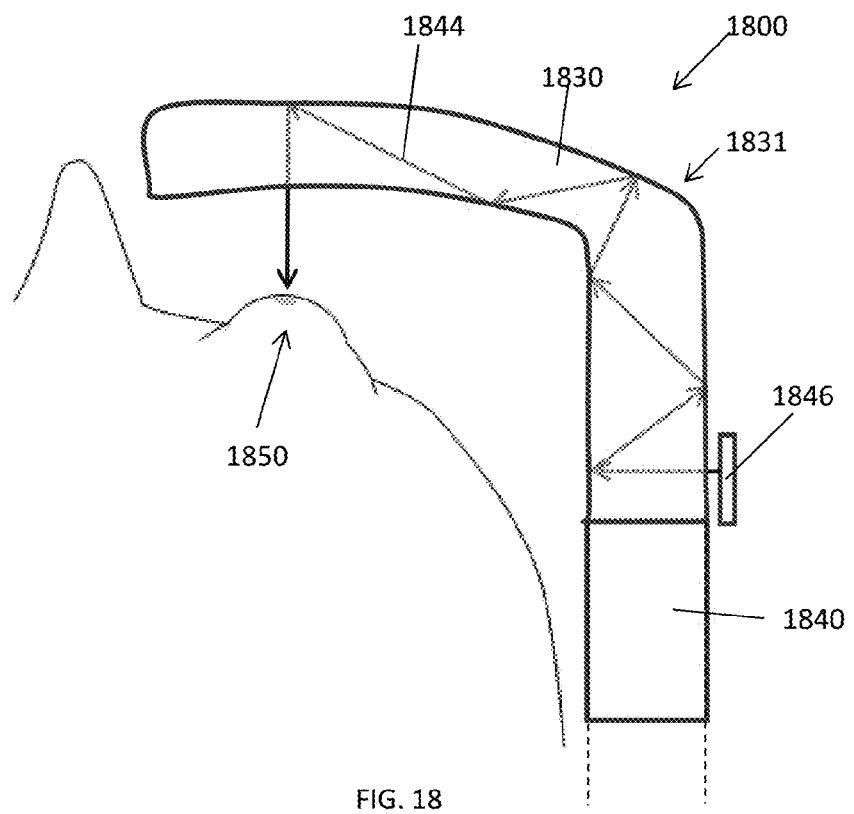
Figure 19:
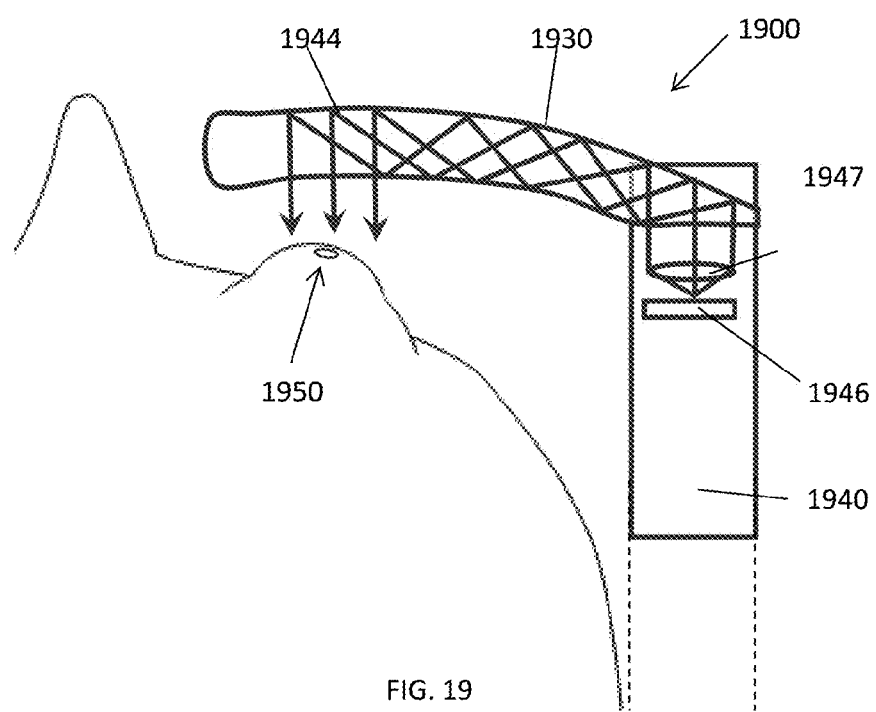
Figure 20:
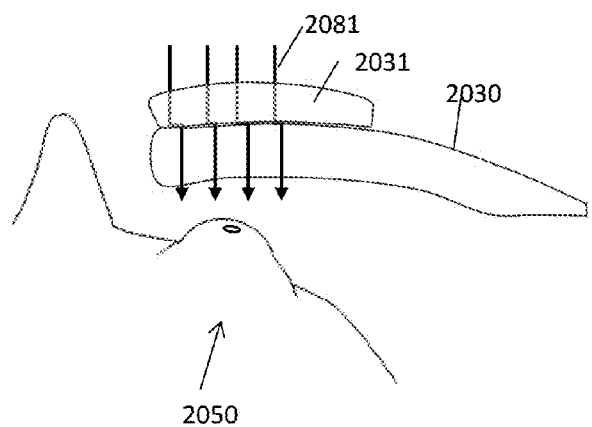
Figure 21:
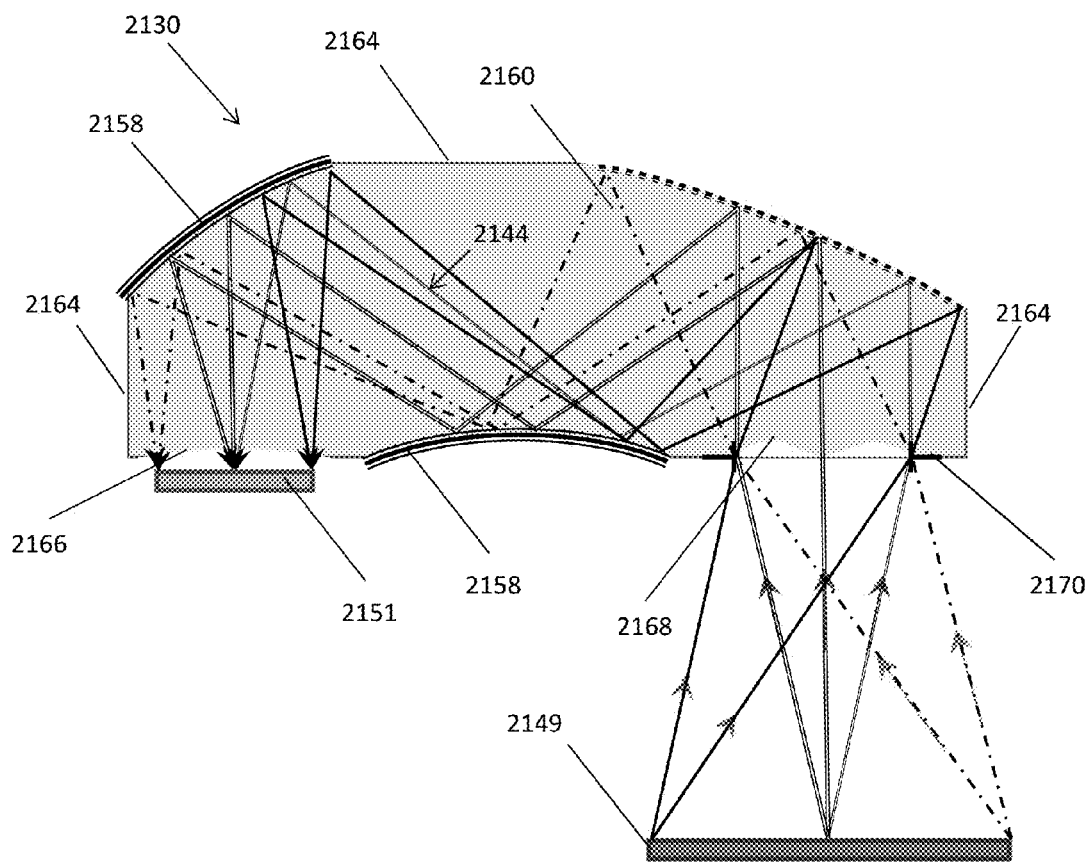
Figure 22A:
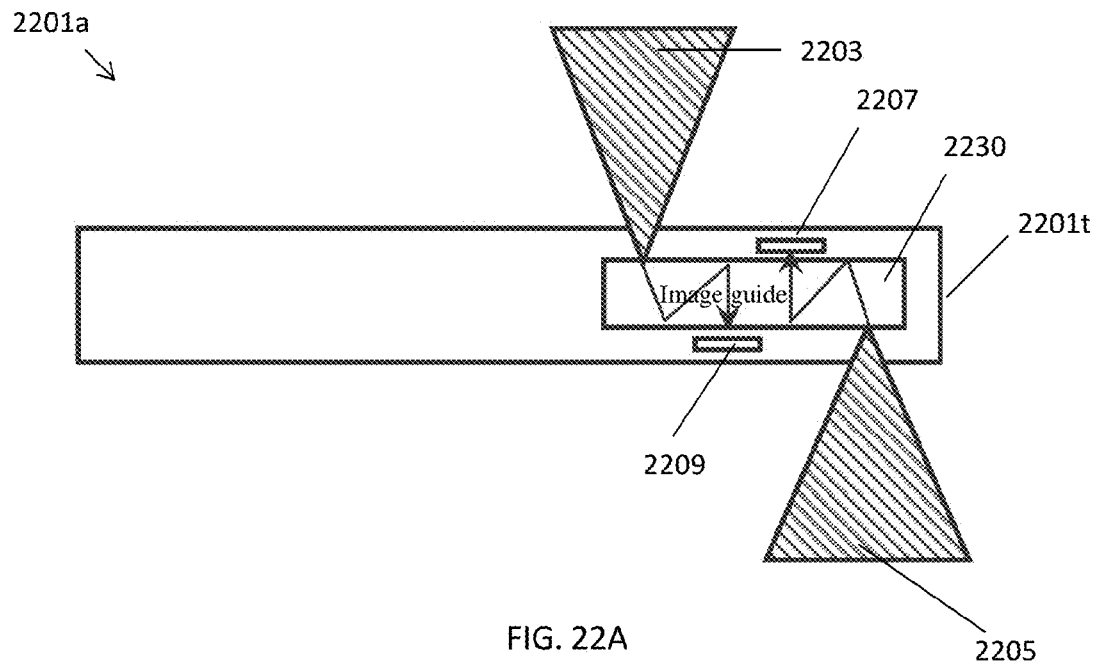
Figure 22B:
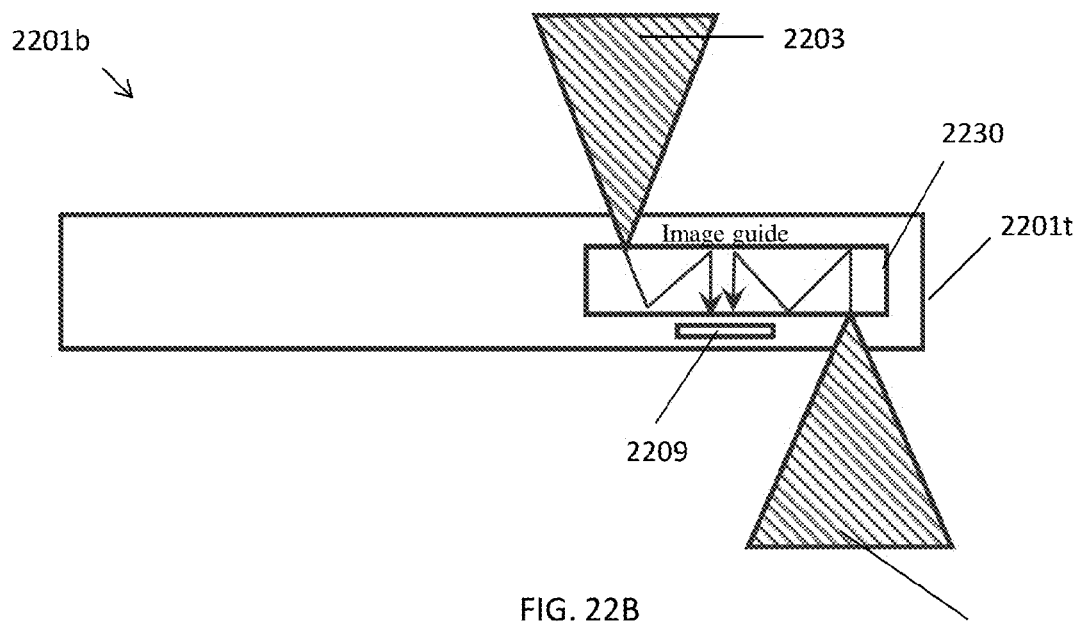
Figure 23:
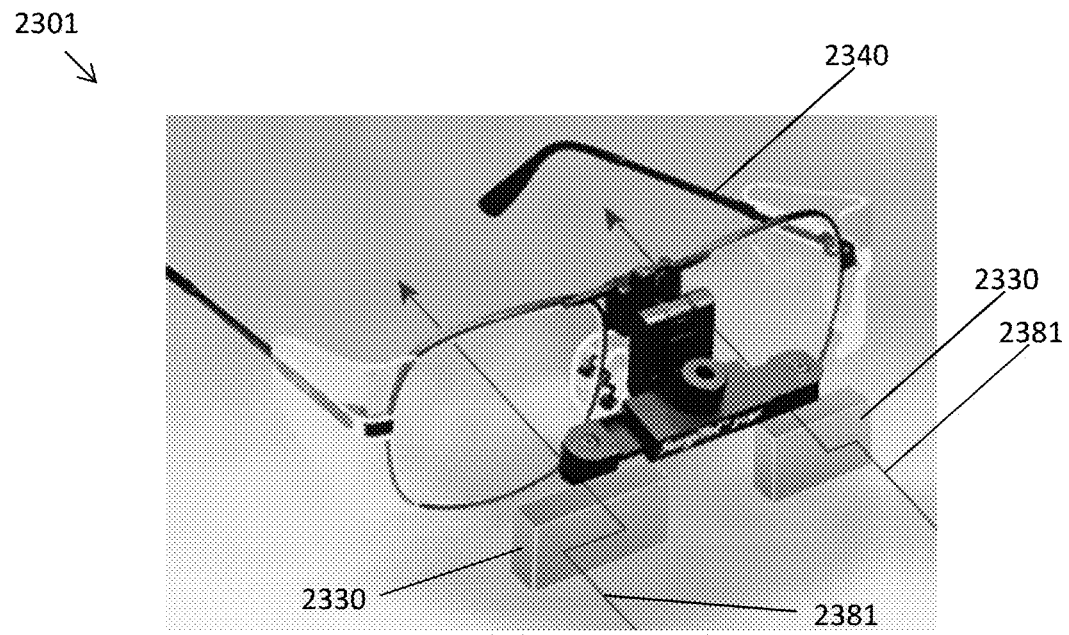
Figure 24:
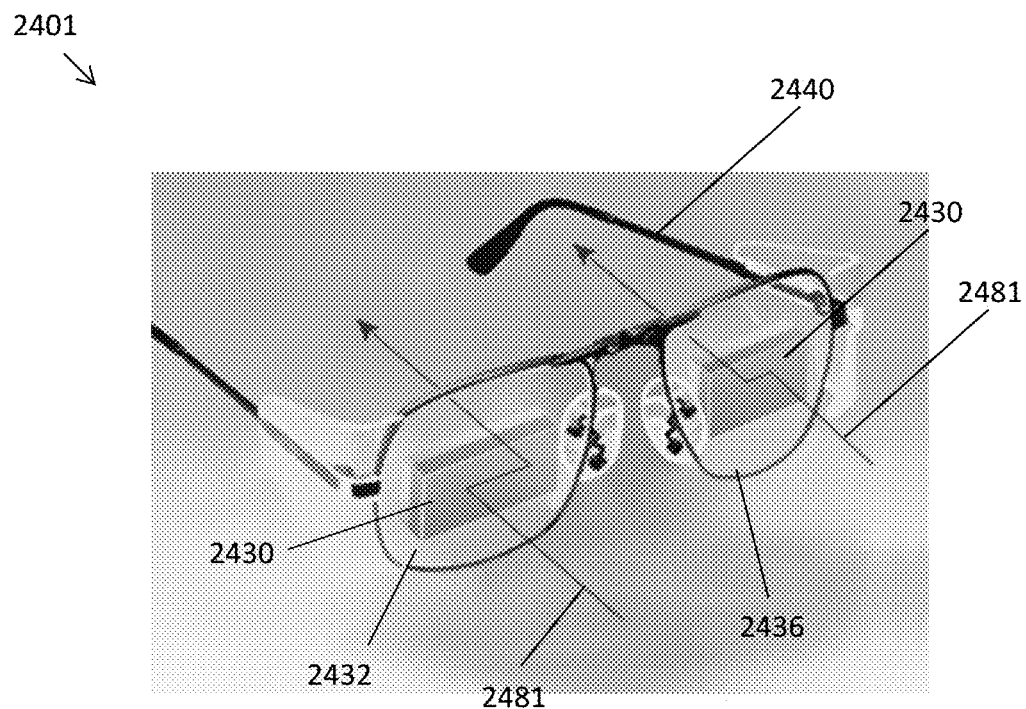
Figure 25:
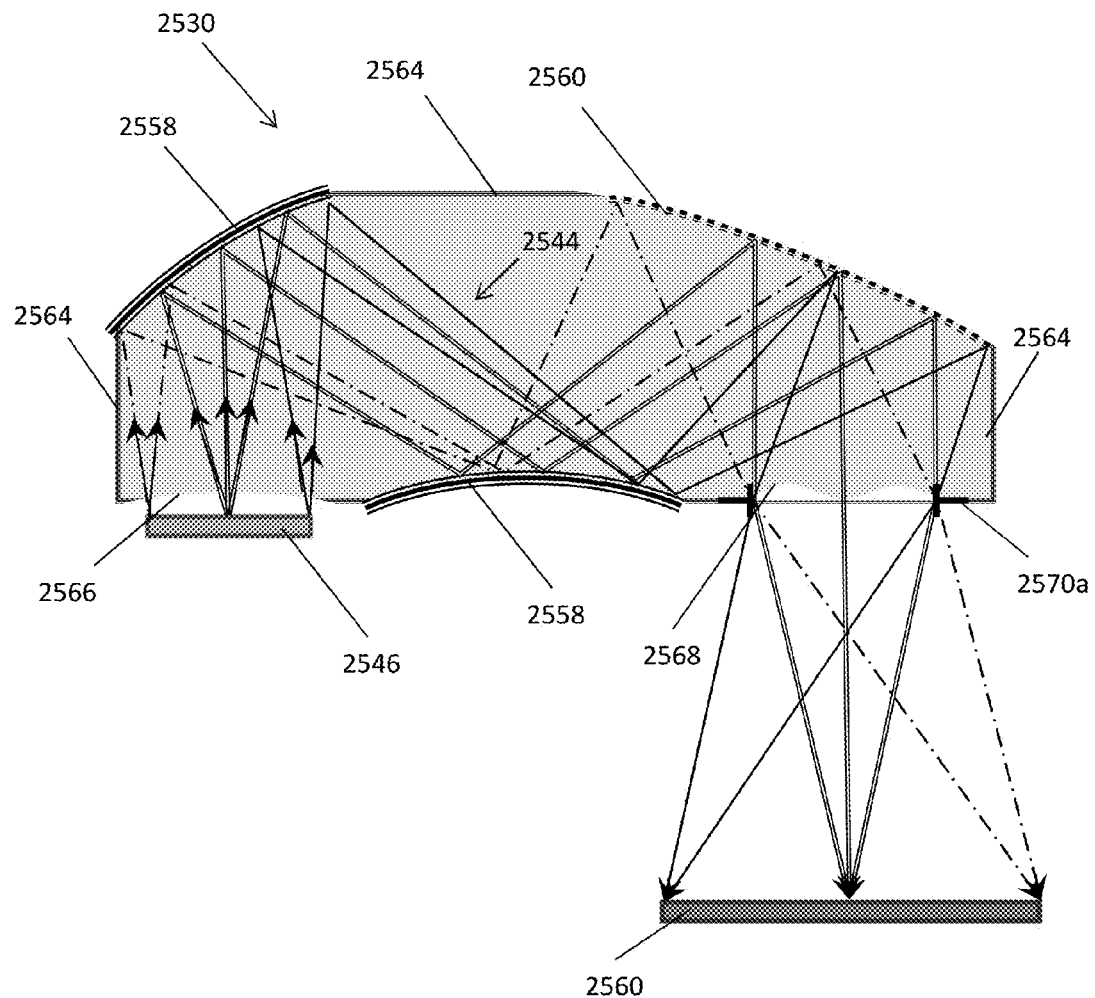

FIG. 6 is a simplified block diagram of a head mounted near eye display system 600, according to some embodiments of the invention;

FIG. 7 is a simplified schematic side view of a head mounted optical device 730, according to some embodiments of the invention;

FIG. 8 is a simplified schematic cross sectional view of an image processing guide including more than one material type, according to some embodiments of the invention;

FIG. 9 is a simplified schematic cross sectional view of an afocal-focal image processing guide, according to some embodiments of the invention;

FIG. 10 is a simplified schematic cross sectional view of an afocal-focal image processing guide, including different materials, according to some embodiments of the invention;

FIG. 11 is a simplified schematic cross sectional view of afocal-focal image processing guide, including a gap, according to some embodiments of the invention;

FIG. 12 is a simplified schematic cross sectional view of an afocal-afocal image processing guide, according to some embodiments of the invention;

FIG. 13 is as simplified schematic top view of an image processing guide 1330, according to some embodiments of the invention;

FIG. 14 is as simplified schematic top view of an image processing guide 1430, which focuses and zooms according to some embodiments of the invention;

FIGS. 15A and 15B are simplified schematic top views of an image processing guide including more than one moving portion, according to some embodiments of the invention;

FIG. 16 is a simplified top view of a portion of a head mounted near eye display 1600, according to some embodiments of the invention;

FIG. 17 is a simplified top view of a portion of a head mounted near eye display 1600, according to some embodiments of the invention;

FIG. 18 is a simplified schematic top view of an image processing guide including a bend, according to some embodiments of the invention;

FIG. 19 is a simplified top view of a portion of a head mounted near eye display including a coupling element, according to some embodiments of the invention;

FIG. 20 is a simplified schematic top view of an image processing guide including scene correcting optics, according to some embodiments of the invention;

FIG. 21 is a simplified schematic cross sectional view of a device including an image processing guide which transfers light from an object to a sensor, according to some embodiments of the invention;

FIG. 22A is a simplified schematic cross sectional view of a cell phone including an image processing guide which light from more than one FOV, to more than one sensor according to some embodiments of the invention;

FIG. 22B is a simplified schematic cross sectional view of a cell phone including an image processing guide which light from more than one FOV to a single sensor, according to some embodiments of the invention;

FIG. 23 is a simplified schematic of a surgical telescope including image processing guides mounted on a frame, according to some embodiments of the invention;

FIG. 24 is a simplified schematic of a surgical telescope including image processing guides mounted embedded in and/or coupled to surfaces according to some embodiments of the invention; and FIG. 25 is a simplified schematic side view of a projector, including an image processing guide according to some embodiments of the invention.

DESCRIPTION OF SPECIFIC EMBODIMENTS OF THE INVENTION

The present invention, in some embodiments thereof, relates to image processing guides and, more particularly, but not exclusively, to image processing guides for head mounted near eye displays.

Overview

A broad aspect of some embodiments of the invention relates to image processing guides which transfer an optical signal (e.g. an image) whilst performing processing of the signal. In some embodiments, processing includes at least one reflective and/or refractive change in optical signal path. In some embodiments, processing, for example, includes magnification and/or focusing and/or reduction of aberration in the signal (e.g. geometrical and/or chromatic aberration) and/or change in color balance and/or filtering.

An aspect of some embodiments of the invention relates to image processing guides where optical signal rays inputted through an input surface do not maximally converge (e.g. to form an intermediate focal point and/or plane and/or area) during transfer through the guide. Where maximal convergence is a point after which signal rays start to diverge. For example, in some embodiments, there are no image planes within the guide.

An aspect of some embodiments of the invention relates to providing a less distorted image even in the presence of imperfect optics by reducing the angle of convergence and/or divergence of rays within the guide. In some embodiments this allows a solid slab (e.g. plastic) to be used for image processing.

In some embodiments, surfaces of the image processing guide and their separations are configured such that a signal reflected from a reflective surface interacts with a subsequent surface (e.g. causing the signal to be reflected and/or have a change in path) along the optical path before a distance at which the signal focuses (e.g. reaching a focal point of the reflective surface).

In an exemplary embodiment, a focal length of each reflecting surface is equal or smaller than zero, with negative focal length or zero focal length (e.g. diverging reflecting surface) or longer or equal than an optical path distance to a subsequent surface in the optical path. In some embodiments, a focal length of a surface is infinite (planar surface).

For example, in some embodiments, for each reflective surface:

focal length≥D or focal length≤0

Where D is the distance from the current surface to the next surface.

In some embodiments, for each reflective surface, an angle of marginal rays with respect to an angle of a chief ray is between −60° and 60°.

In some embodiments, an image processing guide includes a total divergence or convergence length of the guide is greater than a thickness of the guide multiplied by the number of reflections (K) within the guide:

For example, in some embodiments,

|divergence or convergence length|≥image guide thickness*K

In some embodiments, an overall divergence or convergence length of image guides, according to embodiments of the invention, is unrestricted (e.g. is selected and/or designed to be appropriate for an application): In some embodiments, the image processing guide is focal-afocal or afocal-afocal or afocal-focal, focal-focal (e.g. as described in more detail below).

As, in some embodiments, image processing does not rely on focal length of optical element/s being within the image guide, potentially, in some embodiments, the image processing guide is thin e.g. without reducing quality of outputted signals.

In some embodiments, an image processing guide includes a plurality of reflective surfaces along an optical path, for example 2, or 3, or 4, 2-10 or lower or higher or intermediate numbers. In some embodiments, a percentage of the plurality of reflective surfaces process the optical signal, for example 20%, or 40% or 60% or 80% or 100% or lower or higher or intermediate percentages.

In some embodiments, reflective and/or refractive surfaces (e.g. curved surfaces) which change a path of an optical signal, guiding the signal through the guide, are neither converging and/or diverging. In some embodiments, focal length of image processing guide refractive surfaces (e.g. input surface and/or output surface) have unrestricted focal length (e.g. are selected and/or designed to be appropriate for an application).

In some embodiments, such reflective and/or refractive surfaces are off-axis deflectors. In some embodiments, the image processing guide does not include DOEs.

In some embodiments, lack of focusing within the image guide (e.g. where rays are at moderate angles) includes a potential advantage of transfer of optical signals through the guide with low levels of aberration to the signal, for example, as aberration is related to amount of ray bending.

In some embodiments, the image guide includes one or more reflective (e.g. semi-reflective) and/or refractive surface.

In some embodiments, the image guide includes portions with different refractive indices. In some embodiments, portions with different refractive indices cancel chromatic aberration. For example, in some embodiments, a first portion of material introduces chromatic aberration as the optical signal passes through (e.g. diffracts the optical signal) and the chromatic aberration introduced by the first portion of material is cancelled by a second portion of material through which the optical signal then passes.

An aspect of some embodiments of the invention relates to head mounted and/or wearable near eye displays including one or more image processing guide (e.g. as described herein). In some embodiments, a head mounted near eye displays (HMNED) includes a source (e.g. an image source) located outside a user's direct line of vision and/or normal line of sight and/or outside a user's visual field. The image processing guide transfers an optical signal from the source to a user's eye. In an exemplary embodiment the head mounted near eye display includes a wearable frame (e.g. glasses frame) and image guide forms part of and/or is coupled to and/or is attached to a glasses lens held within the frame. For example, in some embodiments, the image source is located at a glasses lens rim or arm.

In some embodiments, the image guide magnifies an image (e.g. produced by an image source) by reflection of the image rays by one or more curved reflective surface. In some embodiments, the image guide includes a plurality of curved reflective surfaces and, for example, the image is increased incrementally by successive reflections as the image is guided through the image guide.

In some embodiments, successive (successive in a path of an optical signal) curved reflective surfaces are designed to correct aberrations, for example, a curved surface cancelling aberration introduced by a previous (along the optical path) curved surface, for example, a surface cancelling aberration introduced by the material of the guide (e.g. diffraction of the optical signal by the image processing guide material).

In some embodiments, an image guide is an elongated element including a maximum extent. In some embodiments, the maximum extent includes a curved central axis. In some embodiments, an optical path follows a general direction of the maximum element central axis. In some embodiments, the maximum extent is at least 5 times, or at least 10 times or at least 2.5 times a minimum extent of the image guide (elsewhere termed "thickness"). In some embodiments, the maximum extent is 3 times or 1.5 times or 6 times a height of said image guide, where the height is a dimension perpendicular to said maximum and minimum extent.

In some embodiments, a radius of curvature (e.g. "bend" in the image processing guide, as described below) is 0.5-10 cm, or 1-7 cm or lower or higher or intermediate ranges or values. In some embodiments, the main axis bends by 10°, or 20°, or, 45°, or 60°, or 10-60°, or 35-55° in one or more dimension.

In some embodiments, an optical signal enters the guide within 5%, or 10%, or 20%, or 30% of a first edge of the maximum extent and exits the guide within 20%, or 5%, or 10%, or 20%, or 30% of a second edge of the maximum extent. In some embodiments, for example, where a single image guide provides images to both eyes, an optical signal enters the guide within 5%, or 10%, or 20%, or 30%, of an edge of the guide and exits the guide within 5%, or 10%, or 20%, or 30%, of a center point of the maximum extent.

In some embodiments, the image guide includes one or more curved reflective surface (e.g. aspheric). In some embodiments, the image guide includes one or more curved reflective surface where the second derivative of the mirror surface curvature is 5-20, or 5-15, or 5-10 or higher or lower or intermediate ranges or values. the image guide includes one or more curved reflective surface where the second derivative of the mirror surface curvature is negative. In some embodiments, the image guide includes one or more curved reflective surface where the second derivative of the mirror surface curvature is approximately zero. In some embodiments, the image guide includes one or more curved reflective surface where the second derivative of the mirror surface curvature is 0-3 or 0.5-1.5, or approximately 1, or higher or lower, or intermediate ranges or values.

Potentially, using curved reflective surfaces to transfer of rays through the image guide contributes to uniform magnification of the entire image with minimal distortion. In some embodiments, magnification is uniform across an image transferred through an image processing guide where image error is 0.1-6%, or 0.5-5% or 0.5-3% or lower or higher or intermediate ranges or percentages. In some embodiments image error is negative (barrel) and/or positive (pincushion). In some embodiments, image error is higher (e.g. up 10-60%, 20-30%, approximately 50%), where, for example, distortion is corrected (e.g. by a source displaying a pre-corrected image).

In some embodiments, for example, use of highly curved reflective surfaces to transfer rays provides a large image eye box, for example, in some embodiments, a system including an image processing guide (e.g. as described herein) has an eyebox of 5×5-10×10 mm, 10×10-20×20 mm, 20×20-30×30 mm, or lower or higher or intermediate ranges or areas. In some embodiments, an eye box is not a square shape, for example, rectangular. Potentially, a large image eye box, means that the performance and/or tolerances of the HMNED are not sensitive to the user eye position from which the entire display is visible.

In some embodiments, the image guide includes refractive surface/s, for example, in front of the user's field of view (FOV), which transfer light by total internal reflection. In some embodiments, a refractive surface remains transparent to transfer of scenic light through the guide to a user's eye, for example, in some embodiments, enabling a user to see a transferred image superimposed on directly viewed real world images.

In some embodiments, the image guide includes semireflective surface/s (e.g. in front of a user's eye) where, for example, the surface reflects a portion of an optical signal travelling within the guide while transmitting scenic light through the guide.

In some embodiments, one or more surface includes a selective coating which, for example is reflective to selective wavelength/s of light (e.g. multiband) and is transmitting to other wavelengths of light. For example, in some embodiments, a surface (e.g. in front of a user's eye) is coated with a selective coating, reflective to optical signal wavelengths (e.g. LCD wavelengths) but transmitting other wavelengths (e.g. of scenic light), for example to a user's eye.

In some embodiments, a head mounted display includes one or more compensation element which corrects real world ambient/scenic light for distortion introduced by the image guide. In some embodiments, the compensation element is part of the single piece of material forming the image guide. Alternatively, in some embodiments, the compensation element is a separate element attached (e.g. glued) for example to the guide and/or another portion of the HMNED.

In some embodiments, a head mounted display includes an one or more eyesight correction element, to correct a user's vision. In some embodiments, the eyesight correction element is part of the single piece of material forming the image guide. Alternatively, in some embodiments, one or more eyesight correction element is a separate element attached (e.g. glued) for example to the guide and/or another portion of the HMNED. In some embodiments, a HMNED includes corrective glasses lens/es.

In some embodiments, the image guide is constructed of a single piece of material, where the material is, for example, shaped to provide curved surfaces. In some embodiments, coating (e.g. external coating of the material) provides reflective surfaces. In some embodiments, the single piece of material includes sections with different refractive indices. In some embodiments, the image guide is constructed of plastic. Potential benefits of plastic include manufacture by injection molding (e.g. including curved surface/s), that plastic is light-weight, and that plastic is shatter resistant. In some embodiments, the image guide includes an irregular external shape, for example, a freeform shape (e.g. constructed by molding using plastic). In some embodiments, the image guide includes a parametric external shape.

In some embodiments, the image guide transfers the optical signal horizontally (e.g. from proximity to a user's ear towards the user's eye pupil). Additionally or alternatively, in some embodiments, the image guide is transfers the optical signal to the user's eye following a path including a vertical transfer (e.g. the image source is vertically above the user's eye pupil). Additionally or alternatively, in some embodiments, the image guide transfers the optical signal around a bend (e.g. eye glasses corner).

In some embodiments, the image guide is thin, for example, 0.05-0.5 mm thick, or 0.2-0.5 mm thick, 0.5-5 mm, 5-10 mm, 10-50 mm or approximately 0.3 mm thick, or smaller, or larger, or intermediate ranges or thicknesses. Where thickness is measured as an average distance between the two longest sides including light reflecting elements, of the image processing guide.

In some embodiments, the image guide is light, for example, 0.05-0.5 g, or 0.05-0.3 g, 0.3-1 g, 1-10 g, 10-20 g, or lighter, or heavier, or intermediate ranges or weights. In some embodiments, the image processing guide is constructed of plastic.

An aspect of some embodiments of the invention relates to transfer of an optical signal, where, after transfer, the optical signal has a large FOV. In some embodiments, transfer of an optical signal is achieved using reflective and/or refractive surfaces (e.g. as opposed to using lenses), where, for example, an optical image size is increased incrementally by each reflection and/or refraction, increasing the FOV of the transferred signal. In some embodiments, use of reflective surfaces are used to generate a large FOV without increasing the size of the device (e.g. head mounted near eye display). In some embodiments, transfer of the optical signal using reflective surfaces, results in an output signal which does not suffer from chromatic aberration.

An aspect of some embodiments of the invention relates to magnifying an image without distorting the image and/or introducing a small distortion to the image e.g. uniform magnification across the image. In some embodiments, an image processing guide includes curved aspheric surfaces which magnify the optical signal uniformly within the FOV as the signal passes through the guide. A potential advantage includes the ability to magnify an image with a large FOV.

An aspect of some embodiments of the invention relates to projecting an image with a large eye box (e.g. the area created by the exit pupil and FOV). In some embodiments, an image processing guide generates a large eye box, for example, as the image guide is designed to generate a large exit pupil 5-10 mm, 10-15 mm 15-40 mm, 40-100 mm, and/or large FOV, for example 10-20°, or 20-40°, e.g. by using curved reflective and/or refractive surfaces. In some embodiments, a HMNED projects an image which covers 10-90%, or 20-40% of a user's FOV.

An aspect of some embodiments of the invention relates to efficiency of transfer of an optical signal from a source through an image processing guide. In some embodiments, high efficiency of transfer of the optical signal is related to, for example, embodiments including a small number of transfers between air and optical elements, for example less than 5, less than 4, less than 3. In some embodiments, transfer through a guide by reflection results in high transfer efficiency, for example, over 80%, or over 90%, or over 95% or lower or higher or intermediate transfer efficiencies. In some embodiments, a source is directly coupled to an image processing guide, for example, without coupling optics, potentially reducing signal power lost in coupling between a source and the image processing guide.

An aspect of some embodiments of the invention relates to vertical expansion of the image processing guide exit pupil. In some embodiments, symmetrical surfaces generate a symmetrical exit pupil including a vertical component. In some embodiments, vertical expansion of the image processing guide exit pupil is related to a vertical dimension of the image processing guide.

An aspect of some embodiments of the invention relates to a small dimensioned and/or lightweight optical components for head mounted near eye display. In some embodiments, an optical signal is directly coupled from a source into an image processing guide. In some embodiments, optical processing of a the signal is performed by a single image processing guide element which, for example, provides one or more of transfer of the image from the source (e.g. to the user's eye and/or to a display), magnification of the image and image correction.

An aspect of some embodiments of the invention relates to device manufacturing tolerances. In some embodiments, a HMNED for example, lack of coupling components and/or image transfer using a single image processing potentially results in a device with high manufacturing tolerances, where, for example, manufacture of the device involves positioning of fewer components. In some embodiments, image processing and/or transfer using a single element means that distortions introduced by the guide are constant and, for example, in some embodiments, are corrected using digital image processing. Optionally, in some embodiments a HMNED includes memory including calibration parameters for an image guide (e.g. a particular guide used in the HMNED).

An aspect of some embodiments of the invention relates to focus and/or zoom of an optical signal outputted from the image processing guide (e.g. projected and/or displayed image). In some embodiments, a position of the image processing guide with is moved to focus the outputted optical signal. Additionally or alternatively, a position of one or more focusing element (e.g. lens) with respect to the image processing guide is changed. In some embodiments, zoom and/or magnification (in some embodiments, magnification is additional) and/or focusing is provided by one positioning one or more zoom element (e.g. lens) with respect to the image processing guide while positioning the image guide with respect to a target (e.g. display, user's eye, sensor). In some embodiments, positioning of different parts of an image processing guide are changed with respect to each other for focusing and/or zoom e.g. movement of optical path-changing surfaces with respect to each other.

Embodiments of the present invention, for example, provide the technology for optical configuration of optical systems which are light and/or thin and/or and small in dimensions and/or have a single element and/or low sensitivity to tolerances and/or provide high optical quality and/or high throughput and/or uniform intensity across the FOV and/or and small amount of aberrations.

In some embodiments, the image processing element comprises multiple sections. In some embodiments, one or more portion of the image processing element includes, one or more of the following features: the curvatures of a portion surface (spheric or aspheric), optical coating/s of the surfaces, substrate material type/s, and the combination of diffractive optical sub-elements within the section. In some embodiments, the effect of each section of the image processing guide is configured to be equivalent to an element in a large volume system which is composed of, for example, lenses and/or reflectors, and/or prisms.

For example, in some embodiments, a reflection from a curved surface has similar function to that of an optical lens in a large volume system.

Potentially, the image processing guide has the same performance as that of a large volume optical system, and with appropriate configuration potentially has advantages of such a system.

Issues addressed by some embodiments of the invention include that the volume size which an optical device occupies is critical, and there is an increasing demand for high-performance, compact optical systems in many applications such as: cell-phone cameras, laptop cameras, personal digital assistants (PDAs), digital still cameras, projectors, airborne optical systems, head mounted displays (HMD), heads-up display (HUD), wearable near eye display (NED), space optical systems, and concentrator for solar cells.

Issues addressed by some embodiments of the invention include optical systems for imaging and non-imaging applications.

Issues addressed by some embodiments of the invention include optical devices and/or elements which are cumbersome, and/or occupy large volume, have many optical elements and/or are heavy, and/or are sensitive to tolerance.

Issues addressed by some embodiments of the invention include optical devices and/or elements which suffer from low image quality due to aberrations and low throughput.

Optimization and design of image guide surfaces may be carried out using Zemax optical software.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Optical Signal Transfer Method

In some embodiments, light is coupled into and out of an image processing guide and is transferred through a path within the guide by Interaction with (e.g. reflection from) surface/s of the guide.

Figures 1A, 1B:
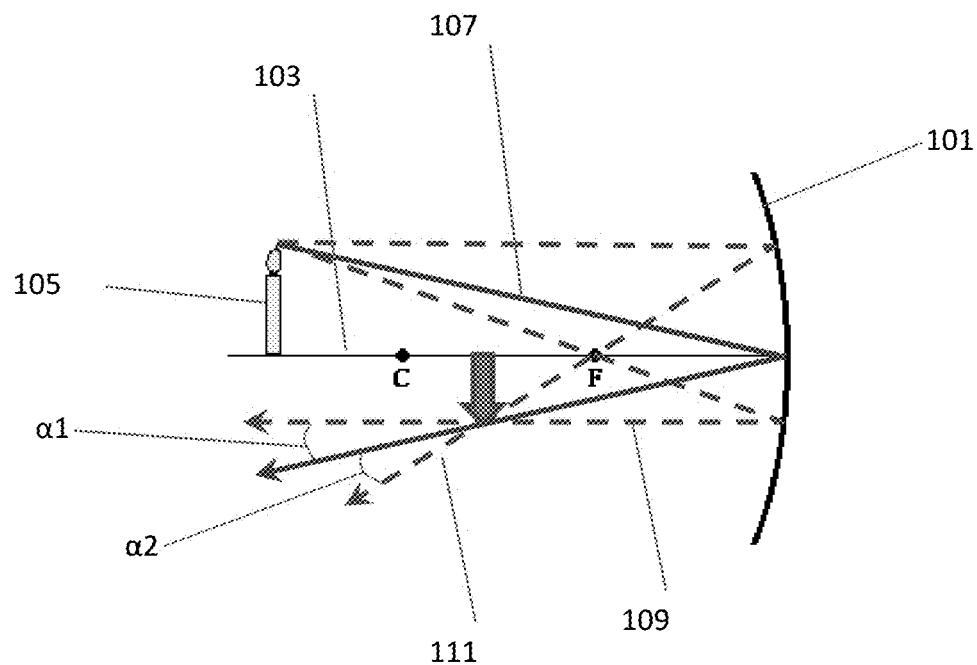

FIG. 1A is a flow chart of a method of image transfer, according to some embodiments of the invention.

At 100 an optical signal is coupled into an image processing guide. For example, in some embodiments, an optical signal is coupled into the guide through a refractive surface (e.g. refractive outer surface) of the guide.

At 102, the optical signal is transferred in at least one direction through the guide, where the optical signal is not focused (e.g. into a focal point and/or image plane) within the guide. In some embodiments, the signal is transferred without significant introduction of chromatic aberration and/or without significant introduction of geometrical aberration (e.g. geometrical distortion, spherical aberration):

In some embodiments, an image processing guide transfers an image from an image source through the guide, without introducing significant chromatic aberrations. For example, where the image source includes projection of an array of pixels, in some embodiments, lateral chromatic aberration is less than an RGB pixel extent, or 2 RGB pixel extents (e.g. depending on a required resolution). In some embodiments, each color has substantially the same axial resolution (e.g. with at most 20%, or at most 10%, or at most 5%, or at most 1% difference in resolution between colors).

For example, where the image source includes projection of an array of pixels, in some embodiments, transfer through the guide changes each pixel color by at most 50 nm, or at most 100 nm or at most 200 nm, or lower, or higher, or intermediate wavelengths, or by at most 1%, or at most 5%, or at most 10% or lower or higher or intermediate percentages.

In some embodiments, an image processing guide transfers an optical signal without significantly introducing geometrical aberration (e.g. distorting the image). For example, where the image source includes projection of an array of pixels, distortion (e.g. pincushion and/or barrel) moves each portion of the image (e.g. each image pixel) by at most 10%, or at most 5%, or at most 4%, or lower, or higher, or intermediate percentages of the image size.

In some embodiments, transfer of the optical signal through the device is by reflection from surface/s, based on total internal reflection (TIR) and/or mirror reflections (e.g. one or more portion of the guide includes a mirror coating).

Optionally, in some embodiments, during transfer of the optical signal, the signal is corrected. In some embodiments, a signal is corrected as well as transferred along an optical path by a surface. In some embodiments, interaction (e.g. reflection) of an optical signal with one or more surface, corrects aberration introduced by a previous and/or future interaction (e.g. with a previous and/or future surface in the optical path and/or correcting aberration due to transition through material of the guide).

At 104, the optical signal is projected out of the image processing guide, for example, into a user's eye and/or onto a display and/or onto a sensor.

Exemplary Signal Path Types

Image processing guides according to aspects of the invention include image sources which produce focal (e.g. rays focus to a point) or afocal (e.g. rays are unidirectional) light from focal or afocal light sources.

For example, in some embodiments, an image processing guide generates an afocal output from a focal input. Such guides are suitable for, for example, near eye displays.

For example, in some embodiments, an image processing guide generates a focal output from an afocal input where, for example light rays (e.g. from an object) are focused on an image plane (e.g. a sensor plane). Such guides are suitable for, for example, cameras, collectors, concentrators, compact cell phone cameras, telescopes.

For example, in some embodiments, an image processing guide generates a focal output from a focal input. For example, light rays emitted from a small area (e.g. object such as display) are focused on an image plane (sensor plane). Such guides are suitable for, for example, projectors, display systems, For example, in some embodiments, an image processing guide generates an afocal output from an afocal input (e.g. parallel rays from a distant location are transformed into parallel rays of different width, either smaller or larger than the input beam). Such guides are suitable for, for example, magnification (e.g. telescope), beam expanders.

Exemplary Image Guide
Exemplary Construction and Materials

In some embodiments, the image processing guide is constructed from a single piece of bulk material.

Exemplary image processing guide materials include plastic, for example, polycarbonate, cyclo olefin polymer, for example, Zeonex® (e.g. E48R, F52R, EP5000, OKP4).

In some embodiments, the image processing guide is constructed of more than one piece and/or material. In some embodiments pieces and/or materials are combined (e.g. to create a monolithic element) using, for example, glue and/or injection molding and/or optical coupling. In some embodiments, the image processing guide includes different portions with different material characteristics (e.g. different refractive indices).

In some embodiments, the image processing guide is constructed (e.g. the bulk material and/or pieces forming the guide) from glass and/or plastic and/or polymer and/or other materials used in optical industry.

In some embodiments, one or more portion of the bulk material is treated e.g. coated and/or heat treated and/or patterned.

Alternatively or additionally, in some embodiments, the image processing guide is constructed where reflective and/or refractive elements constructed of the same or different materials (e.g. one or more optical lens and/or reflecting surface and/or DOE) are separated by a space or gap (e.g. air space, vacuum, cavity at least partially filled with fluid).

In some embodiments, the image processing guide includes one or more planar and/or spheric and/or aspheric and/or diffractive and/or refractive and/or freeform and/or holographic and/or Fresnel and/or micro element array (lens, prisms) surface.

In some embodiments, the image processing guide includes one or more curved external surface. A potential benefit of curved surfaces is relative ease of manufacture (e.g. using injection molding) with respect to planar surfaces.

In some embodiments, image processing guide surfaces includes one or more reflecting, transmitting, semi reflecting/semi transmitting or absorbing (e.g. housing) surface (e.g. curved and/or planar surface).

Manufacturing of the image processing guide and/or other optical elements described herein, in some embodiments, includes exemplary techniques of polishing and/or molding and/or injection molding and/or photolithography and/or wafer level stamping and/or wafer level optics.

Exemplary Image Guide

Figure 1C:
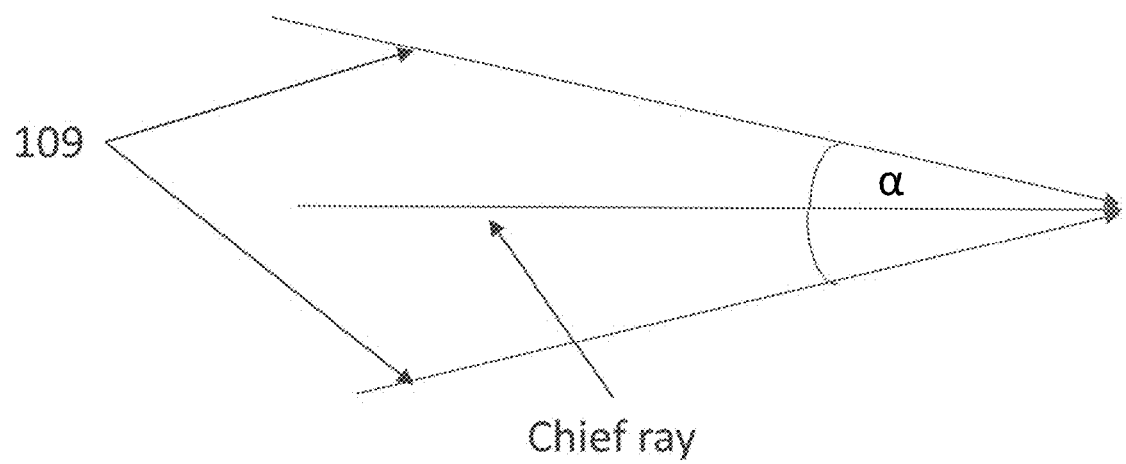
Figure 1D:
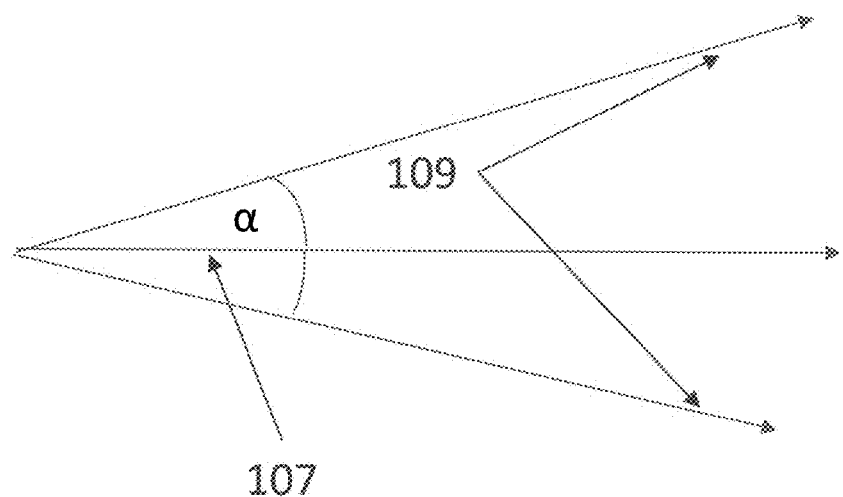
Figure 1E:
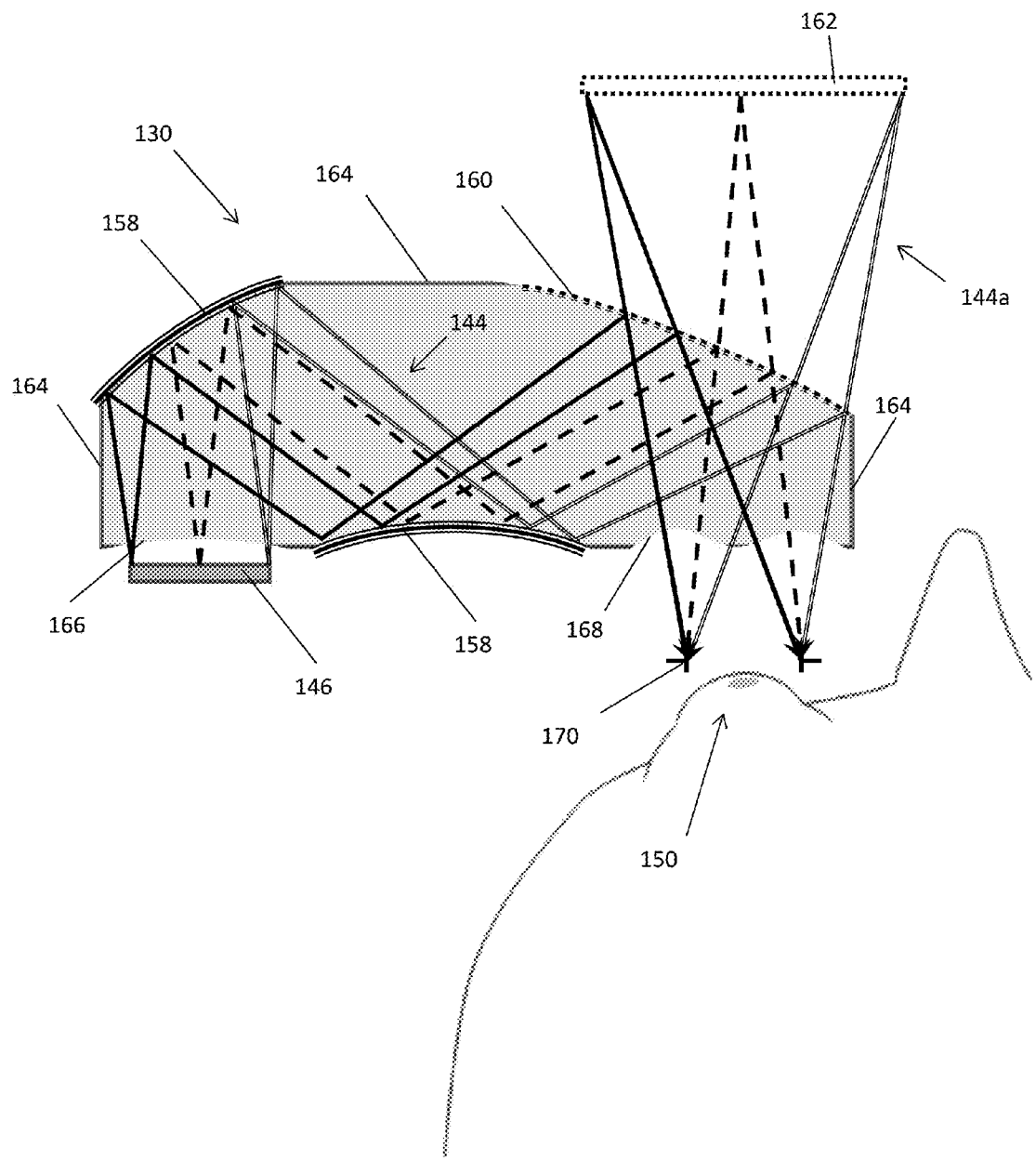

FIG. 1E is a simplified schematic top view showing optical signal paths 144 in an exemplary image processing guide 130, according to some embodiments of the invention.

In some embodiments, image processing guide 130 forms part of a head mounted near eye display (HMNED) where guide 130 guides an optical signal projected by a source 146 to a target (e.g. a user's eye 150).

A particular feature of some embodiments, as illustrated in FIG. 1A, FIG. 3, FIG. 9, FIG. 10, FIG. 11, FIG. 12, FIG. 21 and FIG. 25, referring to FIG. 1A, optical signal paths 144 do not focus to an image within image guide 130 (e.g. focal length of surfaces 158, 158 and 160 are configured to guide the optical signal from source 146 to output 168 without intermediate focus and/or image plane within guide 130).

In some embodiments, an image processing guide focuses inputted light (e.g. the guide includes a focal output), however, there is no intermediate focus and/or image plane within a body of the guide.

In some embodiments, an angle between a chief ray 310*c* and marginal ray 310*m* is between −60° and 60°.

In some embodiments, for each reflective surface, an angle between a chief ray and marginal rays is between maximum angle, α, between a chief ray and marginal rays is less than 80°, or less than 70°, or less than 60°, or higher or lower or intermediate angles.

In some embodiments, the HMNED includes an exit pupil 170 (e.g. as described above).

In some embodiments, optical rays from an image source 146 are coupled directly (e.g. without additional coupling elements) into image processing guide 130 and are guided through guide 130 by reflection and/or refraction at surfaces 158, 160.

Exemplary Surface/s
Exemplary Shape of Surfaces

In some embodiments, one or more surface which transfers an optical signal through an image processing guide is curved. In some embodiments, surface/s are aspheric in shape, for example conic, butterfly wing shape, in at least one dimension.

In some embodiments, one or more surface is rotationally symmetrical, around at least one axis.

In some embodiments, one or more curved surface is rotationally asymmetrical, for example in some embodiments, a surface is curved in one direction and planar in another (e.g. trough shaped).

In some embodiments, one or more surface is planar.

In some embodiments, one or more surface is a freeform shape.

In some embodiments, an external surface (e.g. the entire external surface) of the image processing guide is a freeform shape.

Exemplary Surfaces which Transfer the Optical Signal

In some embodiments, image processing guide 130 includes one or more reflective surface 158. In some embodiments, one or more reflective surface 158 includes curved portion/s (e.g. spheric, aspheric).

In some embodiments, light is transferred at least partially through an image processing guide by a series of reflections at reflecting surface/s.

In some embodiments, one or more reflective surface includes a diffractive structure or DOE (e.g. formed by ridges and/or texture on the surface).

In some embodiments, one or more reflective surface is smooth or includes a smooth portion.

In some embodiments, one or more reflective surface is planar, or includes a planar portion.

In some embodiments, one or more reflective surface is formed by a mirror, for example, by coating a portion of image processing guide 130. In an exemplary embodiment, reflective surfaces 158 are formed by coating (for example, using a low number of layers, e.g. less than 10, or less than 5, or less than 3 coating layers) where, for example, plastic forms the bulk of image processing guide 130.

In some embodiments, reflective surfaces 158 are highly efficient, reflecting 85% or more, or 95% or more, or 98% or more of incident light, or lower, or higher or intermediate percentages of incident light.

In some embodiments, one or more surface of guide 158 of the optical element has different properties (e.g. size, curvature, reflection mechanism) from one or more other surfaces.

In some embodiments, an image processing guide includes one or more semi-reflecting and/or selectively reflecting and/or refractive surface. In some embodiments, one or more surface includes polarizing coating is used.

In some embodiments, a final transfer (e.g. change in angle) of the optical signal is in front of a user eye, for example, surface 160 transfers the optical signal to user eye 150. In some embodiments, a surface in front of a user's eye (optionally a surface which performs a final transfer) allows scenic light to pass from outside (e.g. in front of the user) of the image processing guide to the user's eye.

For example, in embodiments, surface 160 is semi-reflective, e.g. 50% reflective 50% transmitting.

For example, in some embodiments, surface 160, includes a selective coating which, for example is reflective to selective wavelength/s of light (e.g. multiband) and is transmitting to other wavelengths of light. For example, in some embodiments, a surface (e.g. in front of a user's eye) is coated with a selective coating, reflective to optical signal wavelengths (e.g. LCD wavelengths) but transmitting other wavelengths (e.g. of scenic light), for example to a user's eye.

For example, in some embodiments, surface 160 is a refractive surface, transferring the optical signal through total internal reflection.

In some embodiments, one or more coupling surface is refractive. For example, an input coupling surface 166 and/or an output coupling surface 168.

In some embodiments, one or both of coupling surfaces 166, 168 are curved (e.g. aspheric). For example, in an exemplary embodiment illustrated in FIG. 1A, surface 168 is an aspheric butterfly wing shape.

In some embodiments, one or both of coupling surfaces 166, 168 are planar.

In some embodiments, one or more of coupling surfaces 166, 168 include a DOE (e.g. formed by ridges and/or texture on the surface) and/or are smooth. In some embodiments, a DOE facilitates reflecting and/or coupling of light rays at high angles (e.g. over 45°, or over 90°, or over 120°, or over 150°, or over 170°, or higher or lower or intermediate angels) to an image processing guide e.g. with minimal aberration (e.g. chromatic aberration) and/or high efficiency. In some embodiments, a DOE corrects chromatic aberration.

Exemplary Application, Image Processing Guide for Near Eye Display

Referring to FIG. 1E, in some embodiments, the image processing guide, for example, forms part of a head mounted display and the rays exit the guide and travel to a user eye 150, causing a user to view a virtual image 162 (virtual rays 144a make up virtual image 162). In some embodiments, virtual image 162 is a magnified copy of an image projected by image source 146. In some embodiments, for example, as illustrated by FIG. 1, the virtual image is a mirror image of the image projected by image source 146. For example, in some embodiments, depending on the number of reflections, the virtual image is a mirror image, e.g. N shaped guides (e.g. as described herein) producing mirror image virtual images. In some embodiments, the virtual image is the image projected by the source mirrored and/or reversed and/or tilted and/or flipped.

In some embodiments, the image processing guide includes one or more housing 164. In some embodiments, the housing absorbs light rays from within guide 130 and/or light rays external to the guide 130.

Exemplary Source

Exemplary sources 146, for example, suitable for HMNEDs, include micro-LCD, micro-OLED, LCOS, laser/s, scanning mirror, DMD. A potential benefit of a laser source is reduced chromatic aberration, associated with narrow bandwidth of the source signal.

Exemplary Optical Paths within an Image Processing Guide

In some embodiments, a series of surfaces which transfer an optical signal through an image processing guide are orientated such that an optical signal path through the device is planar.

Figure 2A:
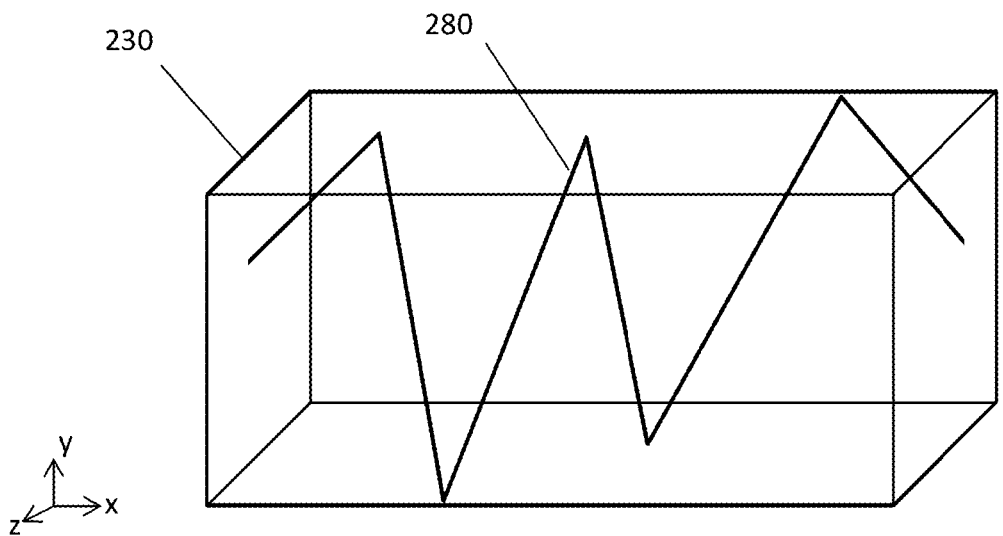

Alternatively, in some embodiments, an optical signal path is non-planar:

FIG. 2A is a simplified schematic three dimensional side view of an optical path 280 through an image processing guide 230, according to some embodiments of the invention.

Figure 2B:
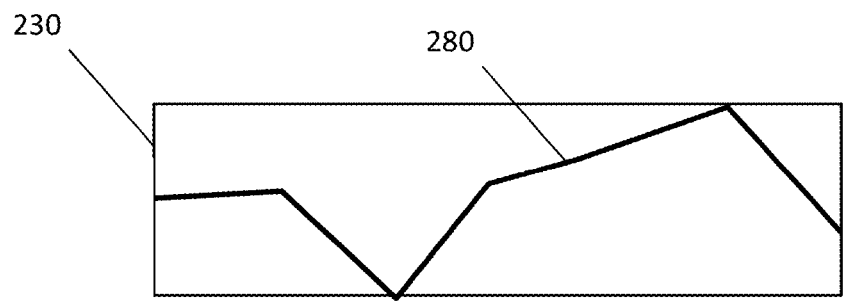

FIG. 2B is a simplified schematic top view of an optical path 280 through an image processing guide 230, according to some embodiments of the invention.

Figure 2C:
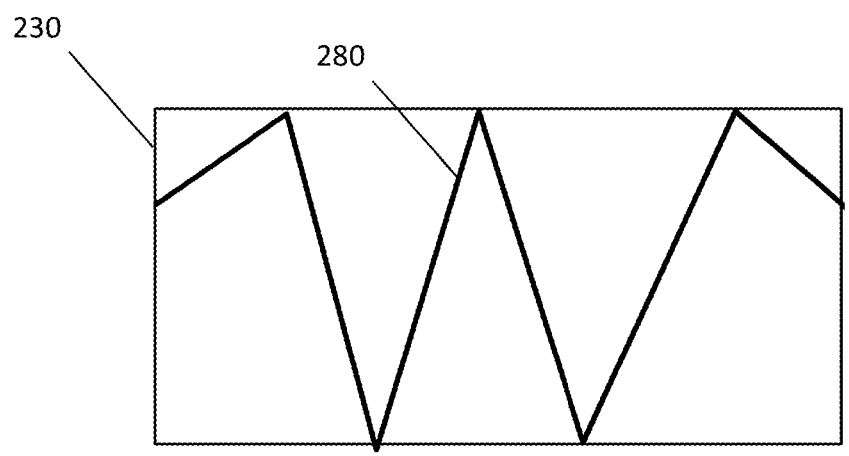

FIG. 2C is a simplified schematic side view of an optical path 280 through an image processing guide 230, according to some embodiments of the invention.

In some embodiments, each stage of an optical path (e.g. between reflections and/or refractions where the path direction changes) is a vector, where vectors corresponding with different and/or successive stages, for example, have different direction in one or more plane.

FIGS. 2A-C show an exemplary optical path 280 through an image processing guide 230, where different optical path stage direction include different x and/or y and/or z components.

In some embodiments, an optical path travels between planes where successive planes have different orientation in at least two dimensions. Where in each dimension the different orientation is by 10°-90°, or 10-70°, or 10°, or 20°, or 30°, or 40°, or 50°, or 60°, or 70°.

Exemplary Multiple Paths in a Single Image Processing Guide

In some embodiments, for each reflective surface, a maximum angle, α between a chief ray and marginal rays is less than 80°, or less than 70°, or less than 60°, or higher or lower or intermediate angles.

FIG. 1B is a simplified schematic illustration of chief 107 and marginal rays 109, 111 for a curved reflective surface 101, according to some embodiments of the invention. In some embodiments, angles between chief and marginal rays α1 and α2 are between −60° and 60°, where, for example, negative angles correspond to divergent surfaces and positive angles correspond to convergent surfaces.

FIG. 1C is a is a simplified schematic illustration of chief 107 and marginal 109 converging rays, according to some embodiments of the invention.

FIG. 1D is a is a simplified schematic illustration of chief 107 and marginal 109 diverging rays, according to some embodiments of the invention.

Where α is the angle between the chief ray and the marginal rays, α is positive for converging rays the negative for diverging rays. In some embodiments a range for α is −80°<α<80°, or −70°<α<70°, or −60°<α<60°, or −40°<α<40°, or −20°<α<20°, or lower, or higher or intermediate ranges or angles.

In some embodiments, an optical path of light rays within an image processing guide is configured to have and input and outputs (e.g. coupling) at the same side, for example, with approximately zero degrees angle between input and output of the guide, this is herein termed an "M-shaped" guide and/or. In some embodiments, an optical path is configured to have input outputs at different sides with, for example, approximately 180° between input and output, this is herein termed an "N-shaped" guide and/or path.

In some embodiments, image processing guides have different angles between an input and output direction of the optical path. In some embodiments, an image processing guide includes a single input and output surface, the path returning an optical signal to an area of the input.

As mentioned previously, in some embodiments, the image processing guide relays and guides optical rays by a series of reflections. In some embodiments, there is a single reflection. In some embodiments, there is a plurality of reflections.

Image processing guides including even numbers of reflections are termed N shape image processing guides, where an image processing guide with 2 reflections is termed N shape and where K reflections (K=2, 4, 6, 8 . . . ) the image guide is termed N shaped to the order K.

Image processing guides including uneven numbers of reflections are termed M-shape image processing guides, where an image processing guide with 3 reflections is termed M shape and where K reflections (K=3, 5, 7 . . . ) the image guide is termed M shaped to the order K.

An M shape or N shape image guide will be used based on system requirements.

In some embodiments, an image guide includes M and N shaped paths. The image guide, in some embodiments, delivers simultaneously more than one optical signal to one or more locations, where different signals follow different optical paths through the device (e.g. a first signal following an M shaped path and a second signal following an N shaped path within the same image processing guide).

Exemplary Focal-Afocal Image Processing Guide

Figure 3:
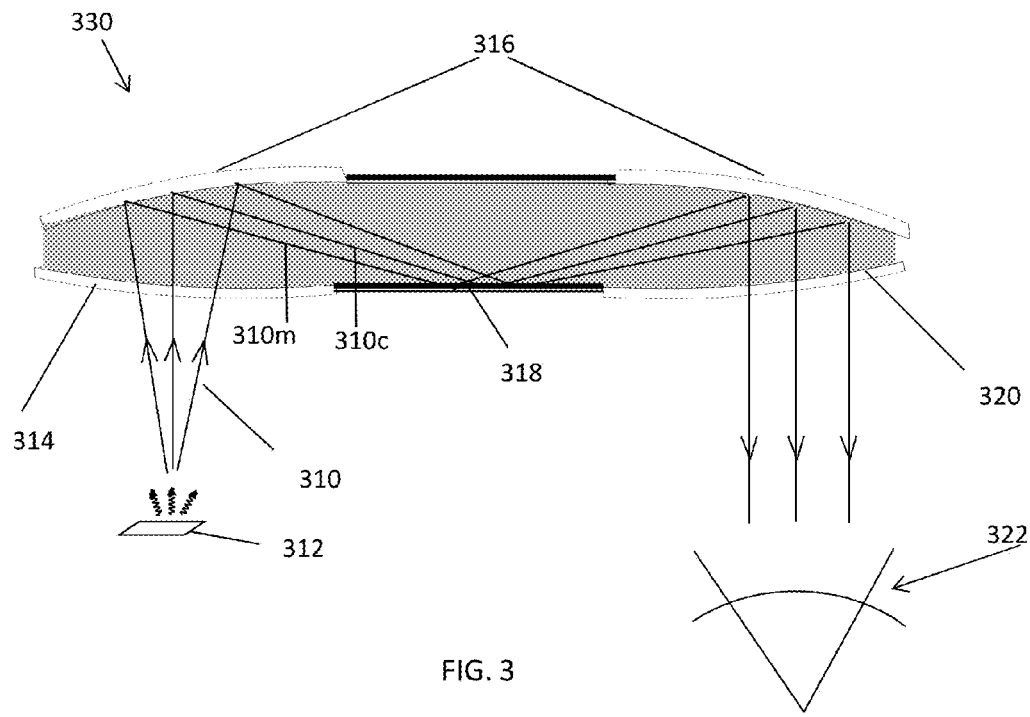

In some embodiments, an image processing guide transforms light rays emitted from a small source and/or object (e.g. a display) into parallel rays. FIG. 3 is a simplified schematic cross sectional view of a focal-afocal image processing guide 330 according to some embodiments of the invention.

In some embodiments, image processing guide 330 is formed by a single element. In some embodiments, image processing guide 330 is thin, for example, with exemplary dimensions as described above.

In some embodiments, light rays 310 from an image source 312 are coupled through a DOE 314 into guide 330. An optical path followed by light rays 310 within guide 330 includes, in some embodiments, curved refractive surfaces 316 and, in some embodiments, planar reflective surfaces 318. Light rays 310 are coupled out of the element through a curved refractive surface 320 and projected to the viewer's eye or an image screen 322.

In some embodiments, one or more image processing guide 330 forms part of a head mounted near eye display (e.g. as described above and/or as illustrated in FIG. 1E, 4, 5, 7, 16-20), where, for example, image source 310 is an LCD screen and/or light rays 312 are is projected to the user's eye/s 322.

Exemplary Head Mounted Device

Figure 4:
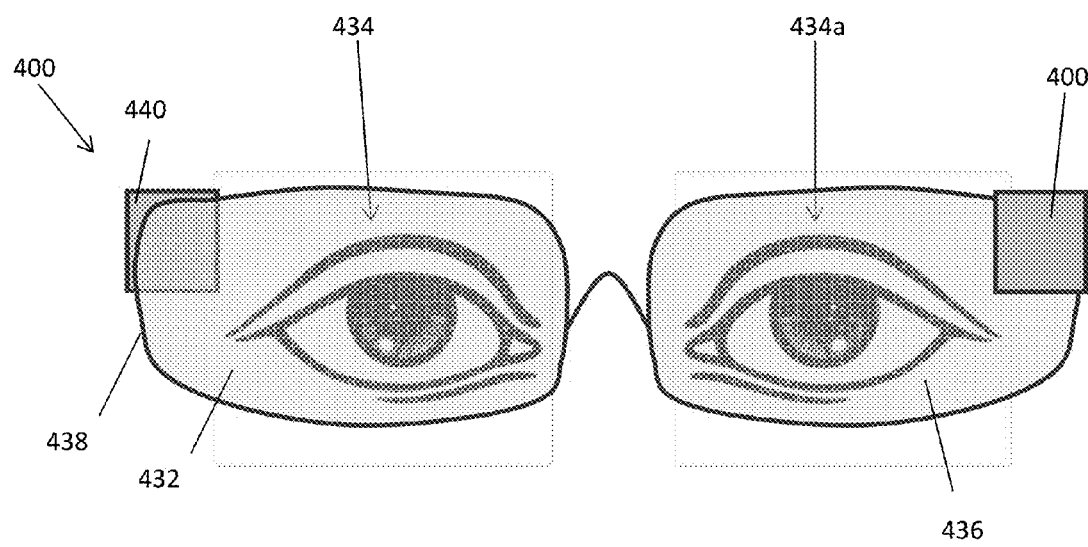

FIG. 4 is a simplified schematic front view of a user wearing a head mounted near eye display 400, according to some embodiments of the invention.

In some embodiments a near eye display includes an image processing guide with a focal-afocal optical path.

In some embodiments, head mounted near eye display 400 includes a surface 432 which, when head mounted near eye display 400 is worn, is located covering a user eye 434. In some embodiments, surface 432 includes at least a portion which is an image processing guide, where the guide guides an optical signal into a user's eye pupil.

In some embodiments, the optical signal is transferred from an image source located at least in the user's peripheral vision, and in some embodiments located such that it is not directly visible to the user. In an exemplary embodiment, the head mounted near eye display is a pair of glasses or goggles. In some embodiments, the image source is located within a glasses rim 438 and/or within a glasses arm 440.

In some embodiments, head mounted near eye display 400 is worn directly on the user's face, where, for example, in some embodiments, surface 432 includes a prescription glasses lens. Alternatively, in some embodiments, head mounted near eye display 100 is worn over a user's glasses and/or sunglasses.

In some embodiments, head mounted near eye display 400 includes a second surface 436. In some embodiments, second surface 436 includes a second image processing guide, transferring a second optical signal (e.g. from a second image source) to a user's second eye 434a. For example, in some embodiments, a first optical signal transferred to a first user eye and a second optical signal transferred to a second user eye generate a three dimensional virtual image viewed by the user. In some embodiments, for example, alternating frames are projected to different eyes.

In some embodiments, first and second optical signals are used to provide an extended display to the user. Alternatively and/or additionally, in some embodiments, the same image is projected into both eyes.

Figure 5:
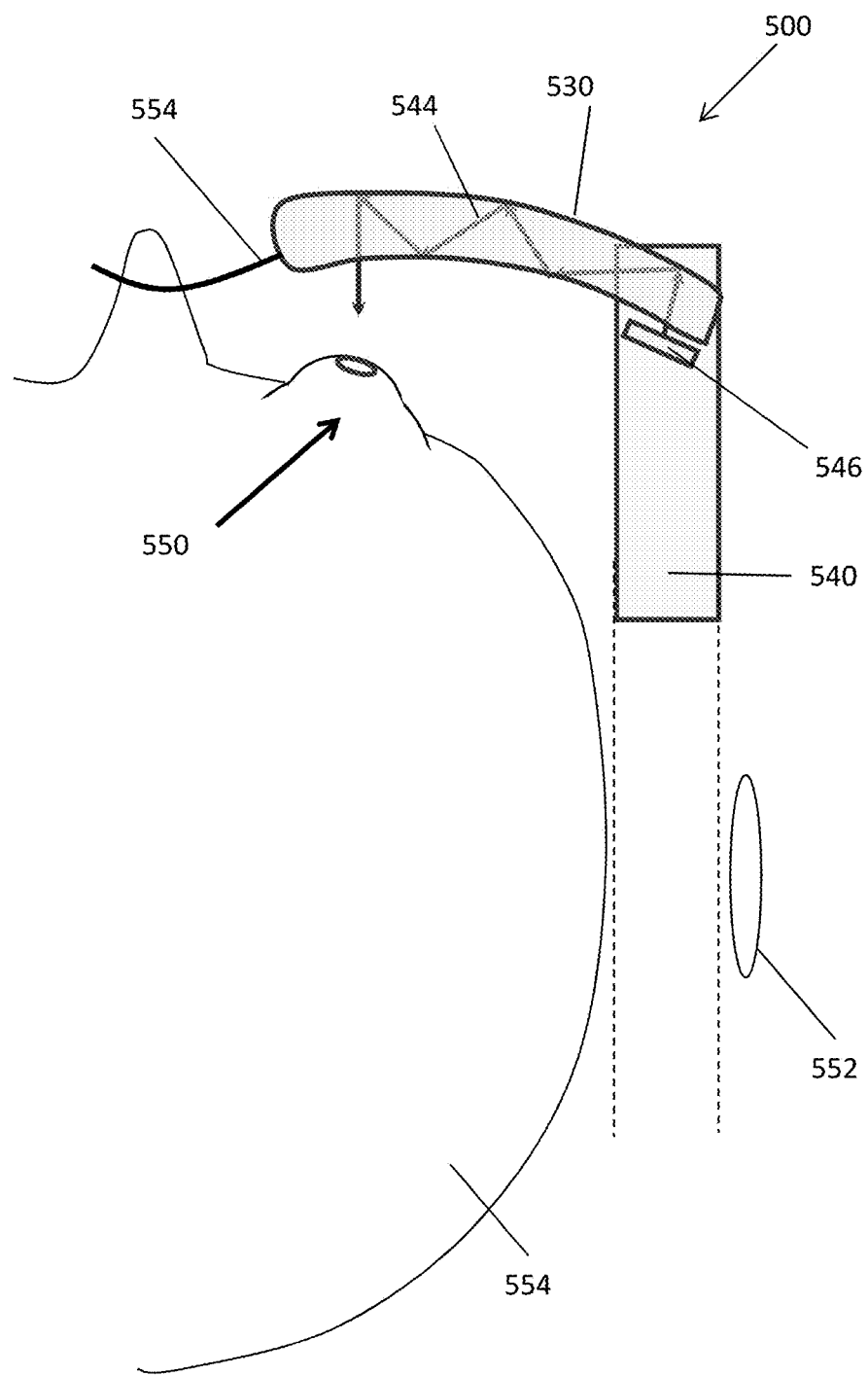

FIG. 5 is a simplified schematic top view of a portion of a head mounted optical device 500, worn by a user according to some embodiments of the invention.

FIG. 5 illustrates transfer, through an image processing guide 530, of an optical signal 544 from a source 546 (e.g. an image source) to a user eye 550. In some embodiments, source 546 is located in a glasses arm 540.

In some embodiments, head mounted near eye display 500 is worn by support provided from one or more arm 540, where arm 540, for example, is supported by a user ear (e.g. fitting between ear 552 and a user head 554). Alternatively or additionally, in some embodiments, head mounted near eye display 500 is worn by support provided by a glasses bridge 554.

In some embodiments, image processing guide 530 is curved, for example, following a curve of a glasses lens e.g. enabling the image processing guide to be part of a glasses lens.

In some embodiments, for example as illustrated in FIG. 5, image source 546 is positioned at an angle to an axis of arm 540.

Alternative image processing guide shapes and positioning of image source/s with respect to the image processing guide are envisioned by the current invention and are described below.

Exemplary Head Mounted Near Eye Display System

FIG. 6 is a simplified block diagram of a head mounted near eye display system 600, according to some embodiments of the invention.

For example, as described elsewhere in this document, in some embodiments, a source 646 is optically coupled to an image processing guide 630, where optical signals are transferred from source 646 to a user's eye.

In some embodiments, a processor 608 communicates to source 646 the optical signals to be displayed. Processor 608 receives optical signals, for example, from memory 618 and/or from an external input device 602 which sends data to processor 608 through communications circuitry 604.

In some embodiments, input device 602 is, for example, a personal electronic device (e.g. cell phone). In some embodiments, input device 602 is a personal computer and/or any electronic device with a display (e.g. TV, measurement equipment, medical equipment such as imagers).

In some embodiments, communications circuitry includes remote communications circuitry (e.g. input device 602 and head mounted display 600 are connected wirelessly). Alternatively, or additionally, in some embodiments, input device 602 and head mounted display 600 are connected with wire/s or cable/s.

In some embodiments, HMNED 600 includes one or more control, for example, one or more button and/or dial and/or input device (e.g. touch screen) through which a user controls and/or sends instructions to processor 608 and/or source 646 and/or image processing guide 630.

For example, in some embodiments, controls 606 include light intensity and/or focus control where a user either directly controls source 646 and/or image processing guide 630 or indirectly controls them e.g. by sending instructions to processor 608.

In some embodiments, a user controls and/or selects what is displayed, for example through controls 606 and/or by directly interacting with input device 602.

Optionally, in some embodiments, HMNED 600 includes mobile device technology, and for example, does not include input device 602.

In some embodiments, HMNED 600 includes one or more output device/s 616, for example, one or more speaker coupled to the device e.g. earphone/s providing sound to a user's ear/s. In some embodiments, output device/s include a microphone and/or camera for example, controlled by control/s 606.

Exemplary Vertical Transfer of Optical Signal

FIG. 7 is a simplified schematic side view of a head mounted optical device 730, according to some embodiments of the invention.

In some embodiments, an image processing guide 742 transfers an optical signal 744 from a source 746 (e.g. an image source) through a path which includes a vertical transfer 748, for example, as well as a horizontal transfer (e.g. from glasses arm to the user's eye). In some embodiments, vertical transfer 748 is achieved by reflection of the optical signal by surfaces 794 where surfaces 794 have curvature including a component perpendicular to the vertical.

In some embodiments, when head mounted near eye display 730 is worn, source 746 is located vertically above a user eye 750. For example, when head mounted near eye display 730 is a pair of glasses where source 746 is located within a glasses arm 740 and arm 740 rests above user eye 750 (e.g. as arm 740 rests between a user ear 752 and head).

In some embodiments, a source is positioned below a user eye, and vertical transfer is upwards.

Exemplary Image Processing Guide Including Different Materials

FIG. 8 is a simplified schematic cross sectional view of an image processing guide 830 including more than one material type, according to some embodiments of the invention. In some embodiments different material types have different refractive indices.

In an exemplary embodiment, image processing guide 830 includes a first material 872 and a second material 874.

In some embodiments, a boundary between different materials within an image processing guide is shaped, for, example boundary 876 between first material 872 and second material 874 is shaped (e.g. non-planar). In some embodiments, a shaped boundary 876 is used to change the optical signal path within the image processing guide. In some embodiments, boundary surface 876 between the different materials is planar and/or includes planar portion/s. In some embodiments, boundary surface 876 is curved and/or includes curved portion/s.

In some embodiments, an image processing guide includes a plurality of different portions, with different refractive indices, for example, a three dimensional structure comprising portions of different refractive index to adjacent portion/s.

In some embodiments, an image processing guide includes one or more portion with a graded refractive index.

In some embodiments, an image processing guide with different materials is constructed by submitting different portions of a single piece of material to different treatments (e.g. sputtering and/or local heat treatment). Alternatively or additionally, in some embodiments, separate pieces of different types of materials are attached to form an image processing guide.

Exemplary Manufacture/Assembly

In an exemplary embodiment, an image processing guide is manufactured using molding, for example injection molding (e.g. using plastic). In some embodiments, a molded plastic base is partially coated with reflective and/or semi-reflective coating/s. In some embodiments, one or more portion of a molded plastic base is etched (e.g. using lithography) to generate a DOE. Alternatively, in some embodiments, a DOE is constructed by interrupted light absorptive (e.g. opaque) portions (e.g. strips). Potential benefits of molding and/or coating include no need to combine components to construct the image processing guide (e.g. by gluing) and/or no need to cut of element/s and/or no need to polish the base.

In some embodiments, diamond turning and/or polishing are additionally or alternatively employed.

In an exemplary embodiment, an image processing guide is manufactured using wafer level optics technologies (e.g. stamping).

Additional Exemplary Image Processing Guides

Exemplary Afocal-Focal Image Processing Guide

FIG. 9 is a simplified schematic cross sectional view of an afocal-focal image processing guide 924, according to some embodiments of the invention.

In an exemplary embodiment, image processing guide 924 is a single piece of material. In some embodiments, image processing guide 924 is thin, for example, with exemplary dimensions as described above.

In some embodiments, light rays 980 are coupled into the element through a diffractive image processing guide (DOE) 982. Potentially use of DOE 982 is prevents chromatic aberrations, for example, as DOEs behave linearly for a range of wavelengths while, for example refractive surfaces exhibit behavior which is inversely proportional to wavelength.

In some embodiments, light rays 980 follow a path through image processing guide 924, the rays meeting curved refractive surfaces 984 and planar refractive surfaces 986.

In some embodiments, the light rays are coupled out of image processing guide 988 through a curved refractive surface 988.

In an exemplary embodiment, rays are coupled out of the image processing guide onto an array of detectors 990, for example, where image processing guide 924 forms part of a camera (e.g. cell phone camera).

Exemplary Afocal-Focal Image Processing Guide, Different Materials

FIG. 10 is a simplified schematic cross sectional view of an afocal-focal image processing guide, including different materials, according to some embodiments of the invention.

The image processing guide illustrated in FIG. 10 is similar to that illustrated in FIG. 9 except that, in some embodiments, a first material 1072 has a refractive index $n_1$ and a second portion 1074 has a refractive index $n_2$. As illustrated, in FIG. 10, in some embodiments, an optical signal 1080 changes direction (e.g. is refracted) at each passage through a boundary 874 between the two materials. In some embodiments, different refractive indices correct chromatic aberrations, for example, as described above.

Exemplary Air Gap Image Processing Guide

As mentioned previously, in some embodiments, an image processing guide includes optical elements separated by a gap (e.g. an air gap). FIG. 11 illustrates an exemplary embodiment of such an image processing guide where the path is afocal-focal.

FIG. 11 is a simplified schematic cross sectional view of afocal-focal image processing guide, including a gap 1192, according to some embodiments of the invention. In some embodiments, optical-elements are spaced by a gap 1192.

In some embodiments, light rays 1180 are coupled through optical lens 1182 into image processing guide. In some embodiments, the optical path followed by rays 1180 includes curved refractive surfaces 1184 and planar refractive surfaces 1186. In some embodiments, the light is coupled out of the image processing guide through optical lens 1188 onto an array of detectors 1190.

In some embodiments, other image processing guides as described herein (e.g. afocal-afocal, afocal-focal, focal-focal) are implemented using optical elements separated by a gap (e.g. air gap). In some embodiments the gap is a vacuum. In some embodiments, a gap is liquid filled. In some embodiments, an image processing guide is a single piece of material (e.g. molded plastic) including a hollow (e.g. air and/or liquid filled).

Exemplary Afocal-Afocal Image Processing Guide

FIG. 12 is a simplified schematic cross sectional view of an afocal-afocal image processing guide 1230, according to some embodiments of the invention.

In some embodiments, light rays 1200 are coupled into guide 1230 through a refractive surface with a curved shape 1202. In some embodiments, the optical path includes curved refractive surfaces 1204 and planar refractive surfaces 1206. In some embodiments, the light is coupled out of the element through a curved refractive surface 1208.

In some embodiments, the width of the output beam, Wo/p is magnified compared to the input beam Wi/p, the image processing guide acting as a telescope.

Exemplary Focus and Zoom

FIG. 13, FIG. 14, and FIGS. 15A-B show exemplary embodiments of focus and/or zoom of an optical signal transferred through an image processing guide.

FIG. 13 is as simplified schematic top view of an image processing guide 1330, according to some embodiments of the invention. In some embodiments, an optical signal 1380 is transferred through image processing guide 1330 from a source 1346 to a target 1350 (e.g. in the case of a HMNED the target is a user's eye). In some embodiments, optical signal 1380 (e.g. an image) is focused by positioning 1396 the image process guide with respect to source 1346 and/or target 1350.

FIG. 14 is as simplified schematic top view of an image processing guide 1430, which focuses and zooms according to some embodiments of the invention. In some embodiments, an optical signal 1480 is transferred through image processing guide 1430 from a source 1446 to a target 1450 (e.g. in the case of a HMNED the target is a user's eye). In some embodiments, optical signal 1480 (e.g. an image) is focused by positioning 1496 the image process guide with respect to source 1446 and/or target 1450. In some embodiments, zoom (e.g. magnification, which in some embodiments is additional magnification) of the optical signal (e.g. image) is performed by positioning 1496b a zoom element 1398 (e.g. a lens) with respect to source 1446 and/or image guide 1430 and/or target 1450. Zoom element 1496 is illustrated in FIG. 14 as positioned in between the source and image processing guide, however, other positions, e.g. between the image guide and the target, are envisioned and encompassed by the invention.

FIGS. 15A-B are simplified schematic top views of an image processing guide 1530 including more than one moving portion, according to some embodiments of the invention. In some embodiments, focus and/or zoom of an optical signal by moving different parts 1530a, 1530b of image processing guide with respect to each other, for example, as illustrated by the change in position of image processing guide parts 1530a, 1530b between FIG. 15A and FIG. 15B.

In some embodiments, focus and/or zoom is generated by moving a portion (including reflective and/or refractive surfaces) of the image guide with respect to another portion of the image guide. An optical path through the device changes, e.g. generating focus and/or zoom, as relative position and/or orientation of surfaces with respect to each other, which control the signal path (e.g. reflective surface/s and/or refractive surface/s) have changed.

Exemplary HMNEDs
Exemplary Positioning of the Source

FIG. 16 is a simplified top view of a portion of a head mounted near eye display 1600, according to some embodiments of the invention.

In some embodiments, an image processing guide 1630 is shaped such that a source 1646 is positioned proximal to an edge of the guide (for example, as opposed to positioning of the source proximal to a side of the guide e.g. as illustrated in FIG. 5).

FIG. 17 is a simplified top view of a portion of a head mounted near eye display 1700, according to some embodiments of the invention. FIG. 17 illustrates another example of positioning of a source 1746 with respect to an image processing guide 1730 and corresponding shape and/or design of the guide to transfer an optical signal from source 1746 to a target 1750 (e.g. a user's eye).

Exemplary Image Processing Guide Including a Bend

In some embodiments, an image processing guide includes a bend, where, for example, one or more outer surface of the guide bends by more than 45°, for example 45°-150°, or by 45°-110°, or by lower or higher or intermediate angles. In some embodiments, an image processing guide includes more than one bend.

FIG. 18 is a simplified schematic top view of an image processing guide 1830 including a bend 1831, according to some embodiments of the invention. In some embodiment image processing guide is designed (e.g. positioning and/or number, and/or angle of reflective and/or refractive surfaces) such that an optical signal path 1844 transverses the bend in the guide.

In some embodiments, image processing guide 1830 is part of a HMNED 1800 where bend 1831. A potential benefit of an image processing guide including a bend is flexibility in positioning of a source with respect to an output.

Exemplary Device Including Auxiliary Optics

In some embodiments, a device including an image processing guide (for example, an HMNED and/or other applications e.g. as described herein) includes one or more additional optical element. In some embodiments, a device includes one or more additional optical element for focusing and/or zooming an outputted optical signal, for example, as described regarding FIG. 14.

In some embodiments, one or more optical element (e.g. lens) couples an optical signal into an image processing guide and/or one or more optical element couples an optical signal out of an image processing guide.

FIG. 19 is a simplified schematic top view of a portion of a head mounted near eye display 1900 including a coupling element 1947, according to some embodiments of the invention. In some embodiments, coupling element 1947 includes a lens, for example, for focusing an optical signal emitted by a source 1946 into image processing guide 1930.

In some embodiment element 1947 corrects aberration. In some embodiments, an optical element is located between an output surface and a target (e.g. to focus light outputted from the image processing guide into a user's eye).

In some embodiments, a device includes one or more optical element to correct distortion introduced into external light (light not from a signal transferred through the image processing device).

FIG. 20 is a simplified schematic top view of an image processing guide including 2030 scene correcting optical element/s 2031, according to some embodiments of the invention.

In some embodiments, correcting optical element/s 2231 correct distortion of external and/or scene light 2081, distortion, for example, due to curvature and/or of image guide 2030. In some embodiments, correcting optical element/s 2231 are located in front of a user eye, external to image processing guide 2230 (e.g. as illustrated in FIG. 22) and/or eye-side of image processing guide 2230.

Exemplary Applications

In this part we will describe several applications in which the image guide can be used for example: near eye display, cell phone camera, Pico projector, surgical telescope. These examples illustrate the ability of using the image processing guide for in wide range of applications, for example, finite-finite (focal-focal: cameras, projectors), finite-infinite (focal-afocal: NED), infinite-infinite (afocal-afocal: surgical telescope).

Exemplary Cell Phone Camera

In some embodiments, image processing guides, for example as described herein are employed within a cell phone camera. Potentially, replacement of traditional optics by image processing guide/s within a cell phone camera reduces size of the camera and relaxes manufacturing tolerances (e.g. as multiple optical elements do not need to be accurately positioned with respect to each other).

FIG. 21 is a simplified schematic cross sectional view of a device including an image processing guide 2139 which transfers light from an object 2149 to a sensor 2151, according to some embodiments of the invention.

In some embodiments, image processing guide 2139 is thin and/or light (e.g. as quantified previously), which is a potential advantage in cell phone camera applications.

In some embodiments, focusing of a camera (e.g. cell phone camera) including an image processing guide (e.g. image processing guide 2139) is achieved by techniques described regarding FIG. 13 and/or FIG. 14 and/or FIGS. 15A-B where source 1346, 1446, 1546 is an object to be photographed and target 1350, 1450, 1550 is a sensor.

In some embodiments, any optical aberrations (e.g. due to lack of symmetry of an image processing guide) are corrected using image processing of the optical signal received by sensor 2151. In some embodiments, image correction processing is performed on a phone and/or camera ISP (image signal processor) chip with software optionally tailored to the image processing guide/s.

In some embodiments, a single image guide is used to transfer (e.g. simultaneously) two collected images to one or two sensors, for example, as described above in the section titled "Exemplary optical paths, multiple paths in a single image processing guide". In an exemplary embodiment, a first image is transferred from a first side of a cell phone and a second image is transferred from a second side of the cell phone. Potentially, such systems reduce cell phone camera size and complexity.

FIG. 22A is a simplified schematic cross sectional view of a cell phone 2201a including an image processing guide 2230 which light from more than one FOV 2203, 2205 to more than one sensor 2207, 2209, according to some embodiments of the invention.

FIG. 22B is a simplified schematic cross sectional view of a cell phone 2201b including an image processing guide 2230 which light from more than one FOV 2203, 2205 to a single sensor 2207, according to some embodiments of the invention.

In FIG. 22A and FIG. 22B FOVs 2203 and 2205 are on either side of the cell phone. In some embodiments, a FOV is collected into image processing guide 2230 from a top 2201t or bottom of the cell phone.

In some embodiments, collection of the FOV is separated at a distance (e.g. more than 0.5 cm, or more than 1 cm, or more than 5 cm or lower or higher or intermediate values) from the sensor, the guide delivering the image to the sensor.

In some embodiments, an entrance pupil of the image guide is wide potentially increasing light collection to the sensor. For example, in some embodiments, the entrance pupil f-number is F/2-F/1, or F/2-F/1.6 or lower or higher or intermediate values or ranges.

Exemplary Surgical Telescope

In some embodiments, image processing guides (e.g. as described herein) are used in head mounted magnifying devices, for example surgical telescopes (also termed binocular loupes/medical loupes).

FIG. 23 is a simplified schematic of a surgical telescope 2301 including image processing guides 2330 mounted on a frame 2340, according to some embodiments of the invention.

In some embodiments, a frame includes a structure which, is supported by a user's face and/or head. In some embodiments, a wearable frame is self supporting (e.g. supports using pressure, e.g. supplied by elastic portion/s).

FIG. 24 is a simplified schematic of a surgical telescope 2401 including image processing guides 2430 mounted embedded in and/or coupled to surfaces 2432, 2436 according to some embodiments of the invention.

In some embodiments, light rays 2381, 2481 are magnified by passage (e.g. reflection) through image processing guides 2330, 2430 and transferred into user eyes. Potentially, use of image processing guide/s to perform magnification reduces weight, dimensions and complexity of surgical telescopes.

In some embodiments, one or more image processing guide is used to transfer and optionally magnify ambient light to a user's eye. For example, in an exemplary embodiment, one or more image processing guide is used to transfer an image and/or scenic light to a selected (e.g. healthy) portion of a user's eye, potentially assisting vision of a user suffering from blind and/or impaired retinal portion/s (e.g. due to macular degeneration).

Exemplary Pico/Micro Projector

In some embodiments, image processing guides (e.g. as described herein) are used in projectors, for example, projector, pico projector, micro-projector.

FIG. 25 is a simplified schematic side view of a projector, including an image processing guide 2530 according to some embodiments of the invention.

In some embodiments, an optical signal (e.g. image) produced by a source 2546 is transferred through image processing guide 2530, and is magnified by reflections along an optical path through guide 2530 before being projected out of guide 2530 onto a display screen 2560.

In some embodiments, source 2546 includes a self-emitting micro-display (OLED, LED) and/or reflective LCOS and/or transmissive LCOS and/or a scanning laser source (not illustrated).

Potentially, a projector including an image processing guide is small enough to be incorporated into a portable device.

In some embodiments, the image guide is used to transfer an optical signal geometrically as well as magnifying the signal.

In some embodiments, the image guide collects (and optionally projects) light from several image sources.

In some embodiments, an entrance pupil of the image guide is wide potentially increasing light collection from the source. For example, in some embodiments, the entrance pupil f-number is F/2-F/3, or F/1-F/2 or lower or higher or intermediate values or ranges.

In some embodiments, transfer of an optical signal through the image processing guide changes an angle of the signal where, for example an image source is in X-Y plane while the image is projected to a different plane.

Exemplary Wearable Cell Phone

In some embodiments, image processing guides (e.g. as described herein) are used in a wearable (e.g. head mounted) cellular phone (e.g. glasses including cellular phone functionality). In some embodiments, the head mounted cellular phone includes a near eye display for displaying the cell phone data and content. In some embodiments, the head mounted cellular phone includes/or cameras, for example, for image capturing (e.g. 2D and/or 3D and/or including depth) and/or for detecting hand and finger movement e.g. for gesture recognition. In some embodiments, captured movement (e.g. hand and finger movement) is used for controlling phone functionality e.g. manipulation of content. In some embodiments, the head mounted cellular phone includes a GSM (or alike) receiver and transceiver for connection to the cellular network and/or Bluetooth to connect to other devices and/or wireless Wi-Fi for wireless internet and/or connection to other devices.

Exemplary Optical Concentrator

In some embodiments, an image guide collects light rays from an area, and concentrates (e.g. focuses) the rays on a smaller area. For example, in an exemplary embodiment, one or more image processing guide (e.g. as described herein) is used to concentrate light to a solar cell, potentially increasing collection efficiency of the cell. In another exemplary embodiment, an optical concentrator including an image processing guide (e.g. as described herein) is used to concentrate light to a water pipe of a solar panel used to heat the water. In some embodiments, an optical concentrator includes an image processing guide with a single surface which changes an optical path of light travelling through the guide.

General

As used herein the term "about" refers to ±20%.

The terms "comprises", "comprising", "includes", "including", "having" and their conjugates mean "including but not limited to".

The term "consisting of means" "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An image processing guide comprising:
a solid body constructed from a single block of material comprising:
a plurality of surfaces defining an optical pathway from an input surface to an output surface, where said optical pathway connects said plurality of surfaces successively;
wherein said plurality of surfaces comprises at least one curved mirror reflective surface configured to receive light from said optical pathway and to return light to said optical pathway;
wherein said optical signal is not focused to an image plane within the solid body;
wherein said solid body includes a first side which includes a plurality of said surfaces;
wherein said first side has a shape with one geometry and a concavity formed in said shape where said concavity forms one of said surfaces; wherein said plurality of surfaces comprises a first curved mirror surface on said second side, second curved mirror surface on said concavity on said first side, and a refractive surface on said second side.

2. The image processing guide of claim 1, wherein a shortest positive focal length selected from focal lengths of all reflective curved surfaces defining said optical pathway is larger than a distance from said curved surface with said shortest positive focal length to a successive surface in said optical path.

3. The image processing guide of claim 1, wherein an angle of marginal rays with respect to a chief ray reflected from each said reflective surface is between −60° and 60°.

4. The image processing guide of claim 1, wherein an angle of marginal rays with respect to a chief rays reflected from each reflective surface is between −40° and 40°.

5. The image processing guide of claim 1, wherein converging or diverging length of the image processing guide is greater than an average thickness between two longest sides of the image processing guide multiplied by a number curved reflective surface configured to receive light from said optical pathway.

6. The image processing guide of claim 1, wherein said optical path transfers between a plurality of planes where orientation of at least one planes differs from at least one other plane in two dimensions.

7. The image processing guide of claim 1, wherein said input surface is a refractive surface.

8. The image processing guide of claim 1, wherein said optical signal exits the guide through a refractive output surface.

9. The image processing guide of claim 1, wherein the guide is an elongate element, including a maximal extent;
wherein said maximal extent is at least 5 times a thickness of said guide;
wherein said maximal extent is at least 3 times a height of said guide.

10. The image processing guide of 9, wherein a general direction of said optical path follows a central axis of said maximal extent.

11. The image processing guide of 10, wherein said central axis of said maximal extent bends by 35-55°.

12. The image processing guide of claim 1, comprising a diffractive optical element.

13. The image processing guide of claim 1, wherein said image processing guide comprises a freeform external shape.

14. A head mounted near eye display comprising:
an image source producing an optical signal; and
an image processing guide according to claim 1 optically coupled to said image source;
wherein said image processing guide transfers said optical signal to a target.

15. The head mounted near eye display of claim 14, wherein a final curved surface which changes a path of said optical signal is a semi-reflective surface.

16. The head mounted near eye display of claim 14, wherein a final curved surface which changes a path of said optical signal is a selectively reflective surface.

17. The head mounted near eye display of claim 14, comprising one or more scene correcting refractive element, located in front of a user eye;

wherein said one or more correcting refractive element cancels aberration in scenic light from said guide.

18. The head mounted near eye display of claim 14, comprising one or more eyesight correction refractive element;
wherein said eyesight correction element corrects vision of a user.

19. The head mounted near eye display of claim 14, wherein said source is positioned on a head mounted near eye frame such that the source is outside a user's visual field.

20. The head mounted near eye display of claim 14, wherein said output surface and said input surface are, in at least one dimension 45° apart from each other.

21. The head mounted near eye display of claim 14, wherein said optical signal transferred to said target is said optical signal projected by said source guide is geometrically distorted by at most 5%.

22. The head mounted near eye display of claim 14, wherein said optical signal transferred to said target is said optical signal projected by said source guide is geometrically distorted by 1-10%.

23. The head mounted near eye display of claim 14, wherein said optical signal a pixilated image including an average pixel extent,
wherein said optical signal transferred to said target is said optical signal projected by said source with lateral chromatic aberration of less than said average pixel extent.

24. The image processing guide of claim 1, wherein said input surface and said output surface are on said first side of said solid body.

25. The image processing guide of claim 1, wherein said concavity is said curved mirror reflective surface.

26. The head mounted display according to claim 14, wherein said input surface and said output surface are on said first side of said solid body.

27. The image processing guide of claim 14, wherein said concavity is said curved mirror reflective surface.

* * * * *